United States Patent
Sedory

(10) Patent No.: US 9,874,464 B2
(45) Date of Patent: Jan. 23, 2018

(54) SENSOR MOUNT

(71) Applicant: Wastequip, LLC, Charlotte, NC (US)

(72) Inventor: Samuel R. E. Sedory, Charlotte, NC (US)

(73) Assignee: WASTEQUIP, LLC, Charlotte, NC (US)

( * ) Notice: Subject to any disclaimer, the term of this patent is extended or adjusted under 35 U.S.C. 154(b) by 498 days.

(21) Appl. No.: 14/575,534

(22) Filed: Dec. 18, 2014

(65) Prior Publication Data

US 2016/0178411 A1 Jun. 23, 2016

(51) Int. Cl.
*G01D 11/24* (2006.01)
*E01B 9/10* (2006.01)
*G01D 5/20* (2006.01)

(52) U.S. Cl.
CPC .............. *G01D 11/245* (2013.01); *E01B 9/10* (2013.01); *G01D 5/2006* (2013.01)

(58) Field of Classification Search
CPC .......... F16B 35/04; F16B 35/06; F16B 39/04; E01B 9/10; E01B 35/04; G01D 11/24; G01D 11/245
USPC ......... 411/378, 383, 396–397, 432, 103–104
See application file for complete search history.

(56) References Cited

U.S. PATENT DOCUMENTS

| | | |
|---|---|---|
| 2,490,483 A | 12/1949 | Simer |
| 4,302,963 A | 12/1981 | Collins |
| 4,632,352 A | 12/1986 | Stoll |
| 4,797,120 A * | 1/1989 | Ulery ................. H01R 24/42 333/12 |
| 4,827,248 A * | 5/1989 | Crudden ............... F02K 1/766 244/110 B |
| 5,121,110 A | 6/1992 | Mahar, Jr. et al. |
| 5,205,760 A * | 4/1993 | Agut Sanz ............ H01R 13/74 248/27.1 |
| 5,380,136 A * | 1/1995 | Copple ................ F16B 37/044 411/104 |
| 5,413,502 A * | 5/1995 | Wang .................... H01R 24/46 439/314 |
| 5,810,533 A * | 9/1998 | Nakamura ............. B24B 23/02 411/408 |
| 5,834,937 A | 11/1998 | Burris |

(Continued)

FOREIGN PATENT DOCUMENTS

DE 3540195 A1 5/1987
DE 19528474 2/1997

OTHER PUBLICATIONS

International Search Report and Written Opinion of the International Searching Authority dated Apr. 22, 2016 in corresponding International Application No. PCT/US15/66600.

*Primary Examiner* — Roberta S Delisle
(74) *Attorney, Agent, or Firm* — Nelson Mullins Riley & Scarborough LLP

(57) ABSTRACT

An assembly is disclosed. The assembly can comprise a sensor comprising external threads. The assembly can further comprise a flexible mount for mounting the sensor to a support. The flexible mount can threadably engage the external threads of the sensor. Additionally, the flexible mount can comprise a spring-loaded casing and/or an elastomeric sleeve and/or nut, for example. The sensor can extend through the support and can be configured to float and/or shift relative to the support. The flexible mount can be positioned on one side of the support.

19 Claims, 27 Drawing Sheets

(56) References Cited

U.S. PATENT DOCUMENTS

| | | | |
|---|---|---|---|
| 6,015,251 A * | 1/2000 | Chung | F16B 39/32 |
| | | | 411/252 |
| 6,123,578 A | 9/2000 | Truett | |
| 6,457,373 B1 | 10/2002 | Lysen et al. | |
| 6,584,862 B1 | 7/2003 | Molenaar | |
| 6,682,281 B1 * | 1/2004 | Larsen | F16B 35/04 |
| | | | 411/115 |
| 6,682,284 B2 * | 1/2004 | Chen | B24B 45/006 |
| | | | 411/432 |
| 7,501,596 B2 | 3/2009 | Bradley et al. | |
| 7,730,798 B2 | 6/2010 | Lindén | |
| 8,544,352 B2 | 10/2013 | Glatzel et al. | |
| 2001/0024363 A1 | 9/2001 | Erben | |
| 2013/0283928 A1 | 10/2013 | Wiklund | |
| 2013/0291663 A1 | 11/2013 | Postberg | |

\* cited by examiner

SENSOR MOUNT

FIELD

The present disclosure relates to sensor mounts and methods for assembling and using the same.

BACKGROUND

In various industries and applications, a proximity sensor is used to detect the proximity of one object relative to another. For example, a proximity sensor can detect the distance between the sensor and the object. Such sensors are often mounted to moving objects. For example, a proximity sensor can be mounted to a waste disposal truck to control the movement of an arm or a waste container relative to the truck. In other instances, a proximity sensor can be mounted on a stationary object, and can detect the distance between the stationary object and a moving object, for example.

If a proximity sensor is rigidly- or unyieldingly-mounted to an object, collisions with another object may cause damage to the proximity sensor or negatively affect the ability of the object to be detected. For example, if a waste disposal truck unintentionally moves a waste container into colliding contact with a proximity sensor into colliding contact with a curbside waste container, the sensor may be crushed or otherwise damaged by the collision if it is inflexibly mounted to the truck. It is an object of various embodiments of the present disclosure to provide a flexible sensor mount such that collision damage is minimized or prevented.

Proximity sensors an can conform to typical dimensions or standards. For example, in a particular industry or application, a proximity sensor may have a standard threaded outside diameter that is configured to threadably engage a support that has a standard threaded inside diameter. It is an object of various embodiments of the present disclosure to retrofit a standard-size proximity sensor and support for the same with an improved mount.

The foregoing discussion is intended only to illustrate various aspects of the related art in the field at the time and should not be taken as a disavowal of claim scope.

SUMMARY

In at least one form, an assembly comprises a proximity sensor comprising an outer surface, wherein the outer surface comprises a first threaded portion. The assembly further comprises a casing comprising a first part mounted to the proximity sensor and a second part, wherein the first part is movable relative to the second part between a retracted position and an expanded position. The casing further comprises an inner surface comprising a second threaded portion configured to threadably engage the first threaded portion. The assembly furthers comprises a spring intermediate the first part and the second part, wherein the spring is configured to bias the second part toward the expanded position. The assembly further comprises a nut threadably mounted to the first threaded portion of the proximity sensor.

In at least one form, the assembly further comprises a support comprising a first side and a second side, wherein an aperture is defined through the support from the first side to the second side, wherein the proximity sensor extends through the aperture, and wherein the casing is positioned on the first side of the support. In at least one form, the nut is positioned on the second side of the support. In at least one form, the proximity sensor floats within the aperture.

In at least one form, the first part of the casing comprises a pin, and the second part of the casing comprises a bayonet slot structured and dimensioned to receive the pin.

In at least one form, a groove is defined into the inner surface of the casing, and the assembly further comprises a locking ring positioned in the groove.

In at least one form, the proximity sensor comprises an inductive sensor.

In at least one form, the spring comprises a wave spring.

In at least one form, an assembly comprises a proximity sensor comprising an outer surface, wherein the outer surface comprises a first threaded portion. The assembly further comprises a nut comprising an inside portion comprising an inner surface, wherein the inner surface comprises a second threaded portion configured to threadably engage the first threaded portion. The nut further comprises an outside portion and an elastomeric element intermediate the inside portion and the outside portion.

In at least one form, the assembly further comprises a support, wherein an aperture is defined through the support, and wherein the proximity sensor extends through the aperture. In at least one form, the proximity sensor floats within the aperture.

In at least one form, the nut comprises a first nut, and the assembly further comprises a second nut threadably mounted to the first threaded portion. In at least one form, the support comprises a first side and a second side, wherein the first nut is positioned adjacent to the first side of the support, and wherein the second nut is positioned adjacent to the second side of the support.

In at least one form, the inside portion comprises an annular tongue, and the elastomeric element comprises an annular groove structured and dimensioned to receive the annular tongue.

In at least one form, the outside portion comprises an annular tongue, and the elastomeric element comprises an annular groove structured and dimensioned to receive the annular tongue.

In at least one form, the elastomeric element is comprised of rubber.

In at least one form, the inside portion and the outside portion are comprised of metal.

In at least one form, the proximity sensor comprises an inductive sensor.

In at least one form, an assembly comprises a proximity sensor comprising an outer surface, wherein the outer surface comprises a sensor threaded portion. The assembly further comprises a sleeve comprising an inside portion comprising an inner surface, wherein the inner surface comprises an inner threaded portion configured to threadably engage the sensor threaded portion. The sleeve further comprises an outside portion comprising an outer surface, wherein the outer surface comprises an outer threaded portion. The sleeve further comprises an elastomeric element intermediate the inside portion and the outside portion. The assembly further comprises a nut configured to threadably engage the outer threaded portion of the sleeve.

In at least one form, the assembly further comprises a support, wherein an aperture is defined through the support, and wherein the proximity sensor floats within the aperture.

BRIEF DESCRIPTION OF THE DRAWINGS

Various features and advantages and the manner of attaining them will become more apparent and will be better understood by reference to the following description of embodiments in conjunction with the accompanying drawings, in which.

DETAILED DESCRIPTION

Certain exemplary embodiments will now be described to provide an overall understanding of the principles of the structure, function, manufacture, and use of the devices, assemblies, systems, and methods disclosed herein. One or more examples of these embodiments are illustrated in the accompanying drawings. Those of ordinary skill in the art will understand that the devices, assemblies, systems, and methods specifically described herein and illustrated in the accompanying drawings are non-limiting exemplary embodiments and that the scope of the various embodiments is defined solely by the claims. The features illustrated or described in connection with one exemplary embodiment may be combined with the features of other embodiments. Such modifications and variations are intended to be included within the scope of the present disclosure.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Additionally, reference throughout the specification to "various instances," "some instances," "one instance," or "an instance", or the like, means that a particular feature, structure, or characteristic described in connection with the instance is included in at least one instance. Thus, appearances of the phrases "in various instances," "in some instances," "in one instance", "in an instance", or the like, in places throughout the specification are not necessarily all referring to the same instance.

The particular features, structures, or characteristics may be combined in any suitable manner in one or more embodiment or instance. Thus, the particular features, structures, or characteristics illustrated or described in connection with one embodiment or instance may be combined, in whole or in part, with the features structures, or characteristics of one or more other embodiment or instance without limitation. Such modifications and variations are intended to be included within the scope of the present disclosure.

Figure 1:
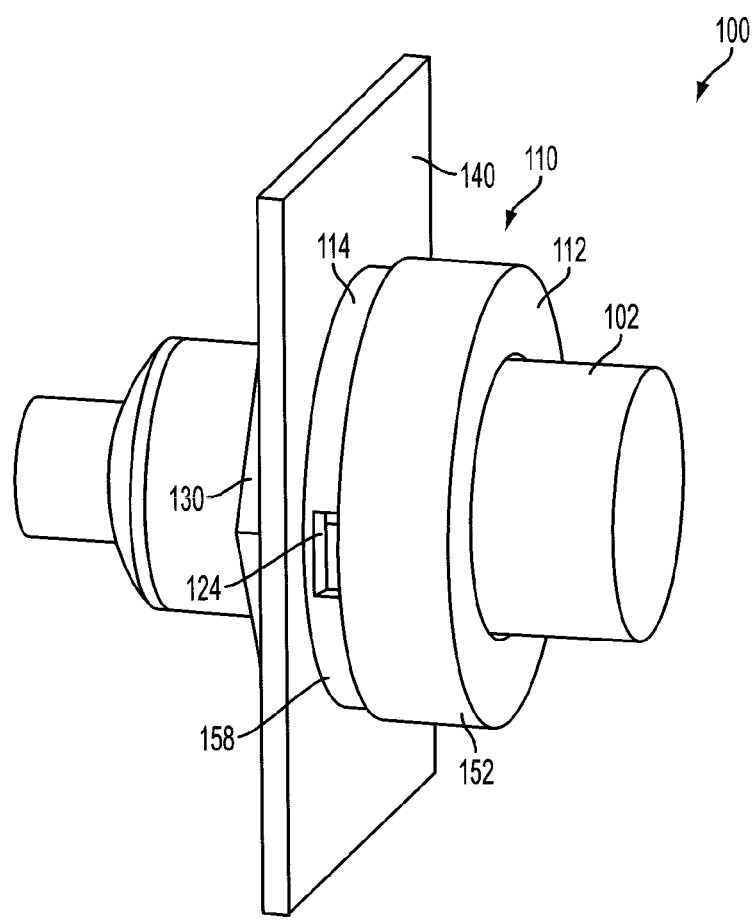
FIG. 1 is a perspective view of a flexible mount, a sensor, a support and a hex nut, according to various embodiments of the present disclosure.
Figure 2:
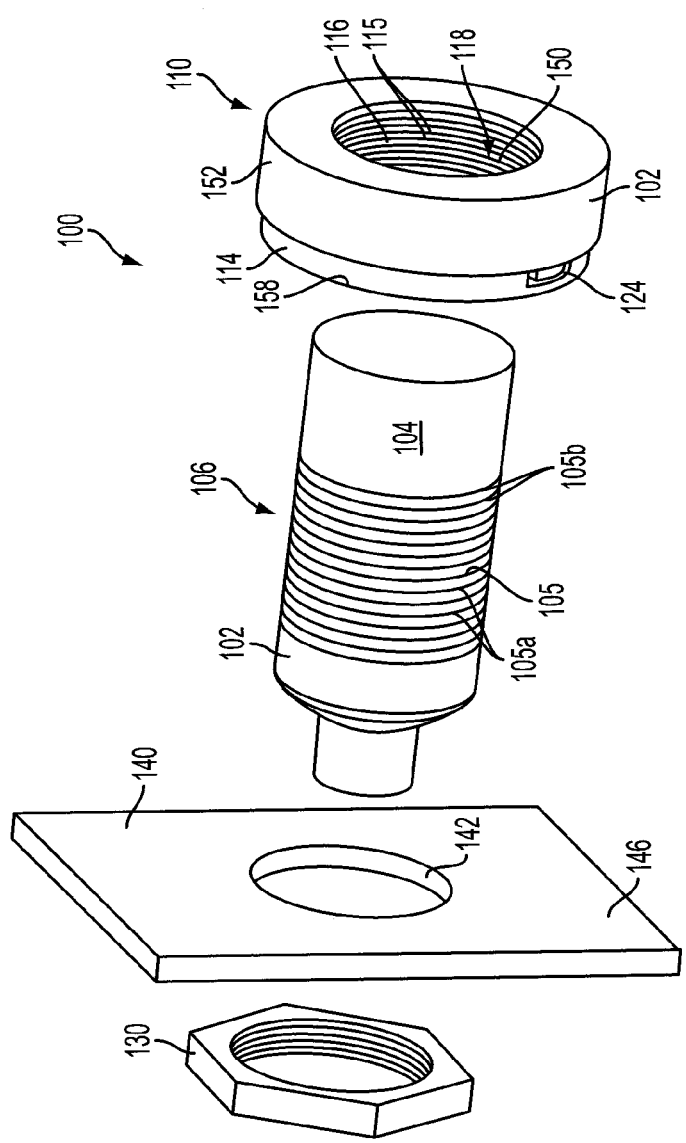
FIG. 2 is an exploded perspective view of the flexible mount, the sensor, the support and the hex nut of FIG. 1, according to various embodiments of the present disclosure.
Figure 3:
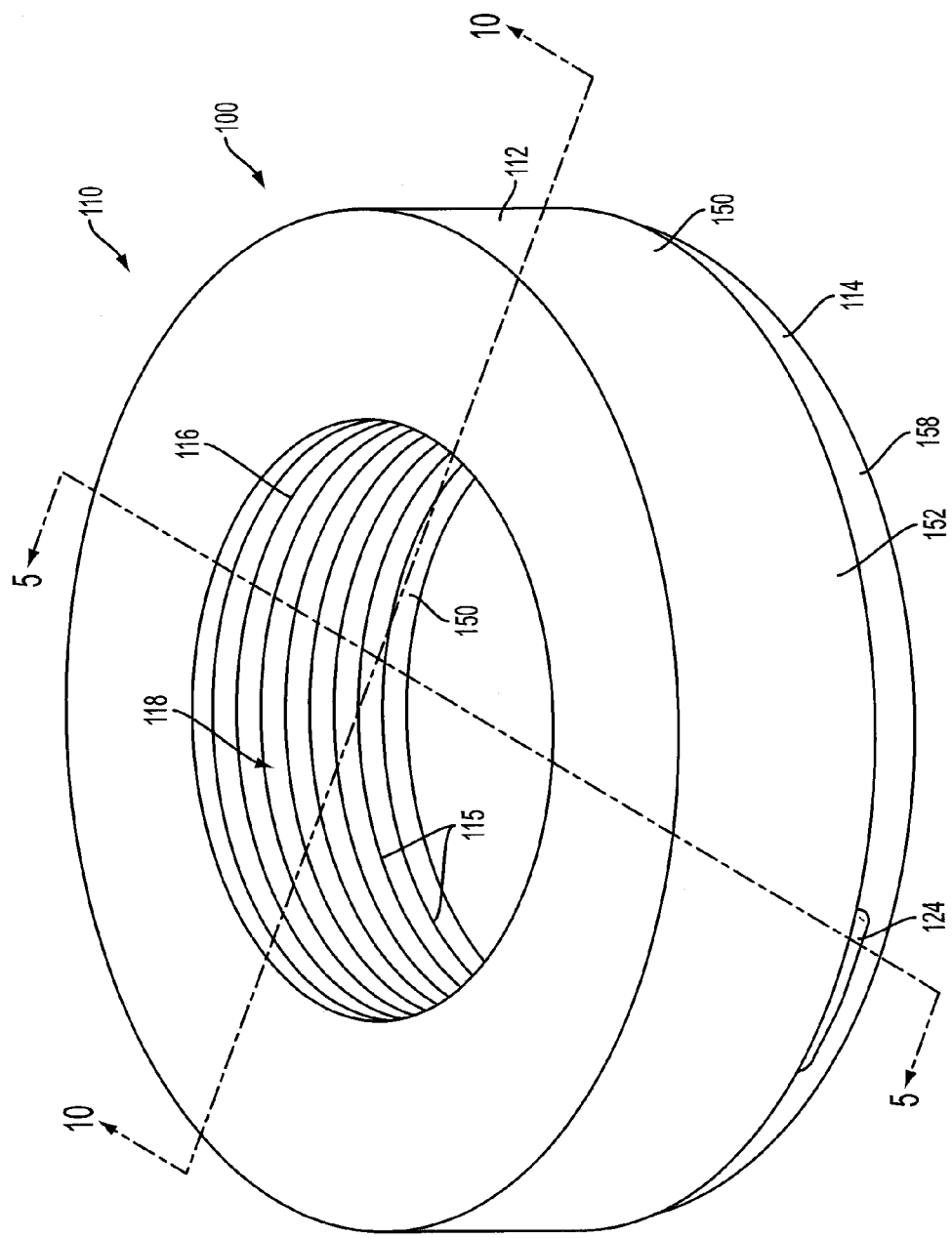
FIG. 3 is a perspective view of the flexible mount of FIG. 1, according to various embodiments of the present disclosure.

A sensor mount 100 and various components and subassemblies thereof are depicted in FIGS. 1-13. Referring to FIGS. 1 and 2, the sensor mount 100 can be used to secure a sensor 102 to a support 140. As described in greater detail herein, the sensor 102 can be indirectly secured to the support 140 via the sensor mount 100. As a result, the sensor 102 may not directly engage the support 140. In such instances, the sensor 102 can be configured to float, shift, or move relative to the support 140. For example, if an object collides with the sensor 102, at least a portion of the sensor mount 100 can flex and rebound to absorb the impact or at least a portion of the impact from the collision. As the sensor mount 100 flexes and rebounds, the sensor 102 attached thereto can shift within a predefined range of motion relative to the support 140.

In various instances, the sensor 102 can be a proximity sensor, which can detect the proximity of an object relative to the sensor 102. In various instances, the sensor 102 can be an induction sensor that generates an electric field and signals a controller when a metallic object enters the electric field. In other instances, the sensor 102 can be a magnetic sensor or a capacitive sensor, for example.

Referring primarily to FIG. 2, the proximity sensor 102 includes an outer surface 104 having a plurality of threads 105. The threads 105 depicted on the outer surface 104 form an exterior threaded region 106, which covers at least a portion of the outer surface 104. In some instances, the exterior threaded region 106 can extend along the entire length of the outer surface 104. Alternatively, in certain instances, the exterior threaded region 106 can cover a portion or portions of the outer surface 104. In certain instances, the exterior threaded region 106 can conform to standard dimensions. For example, the proximity sensor 102 can be a typical- or standard-sized proximity sensor and can be retrofit with the flexible mount 100, as described in greater detail herein.

Referring still to FIG. 2, the flexible mount 100 includes an inner surface 116 having a plurality of threads 115. The threads 115 depicted on the inner surface 116 form an interior threaded region 118, which is dimensioned and structured to threadably engage the threaded region 118 of the proximity sensor 102. The interior threaded region 118 covers at least a portion of the inner surface 116. In some instances, the interior threaded region 118 can extend along the entire length of the inner surface 116. Alternatively, in certain instances, the interior threaded region 118 can cover a portion or portions of the inner surface 116. In certain instances, the exterior threaded region 106 can conform to standard dimensions. For example, the exterior threaded region 106 of various sensors, including the proximity sensor 102, for example, can be configured to threadably engage various flexible mounts 100, including the interior threaded region 118 of the flexible mount 100, for example.

The sensor 102 shown in FIGS. 1 and 2 is configured to fit within an aperture 142 in the support 140. The aperture 142 may conform to standard dimensions. In various instances, a nut, such as the hex nut 130 can threadably engage the sensor 102 on a first side of the support 140. For example, in the embodiment depicted in FIGS. 1 and 2, the hex nut 130 directly engages the exterior threaded region 106 of the sensor 102. Referring still to FIGS. 1 and 2, the flexible mount 100 is configured to threadably engage the sensor 102 on a second, opposite side 146 of the support 140, for example. In various instances, the exterior threaded region 106 can be continuous and can threadably engage the hex nut 130 and the flexible mount 100. In other instances, the exterior threaded region 106 can be interrupted between the nut-engaging threads 105a and the mount-engaging threads 105b, for example. In certain instances, a bearing region can be positioned between the nut-engaging threads 105a and the casing-engaging threads 105b, and the bearing region can be configured to move within the aperture 142 of the support 140.

In various instances, the flexible mount 100 can include an expandable and collapsible casing 110. For example, the flexible mount 100 can comprise a spring-loaded casing, as described in greater detail herein. Referring to the various sensor mount embodiments depicted in FIGS. 1-13, the casing 110 can be a two-part casing, for example, which includes a first part or cover 112 and a second part or base 114. The dual-part casing 110 can be deformable between a first position and a second position. For example, the first part 112 can move between an expanded position relative to the second part 114 and a retracted position relative to the second part 114. As described in greater detail herein, the flexible mount 100 includes a biasing element, such as a coil spring 120 (FIGS. 4-6) or a wave spring 220 (FIGS. 7 and 9-13), for example, which can bias the first part 112 from the retracted position toward the expanded position, for example.

Figure 8:
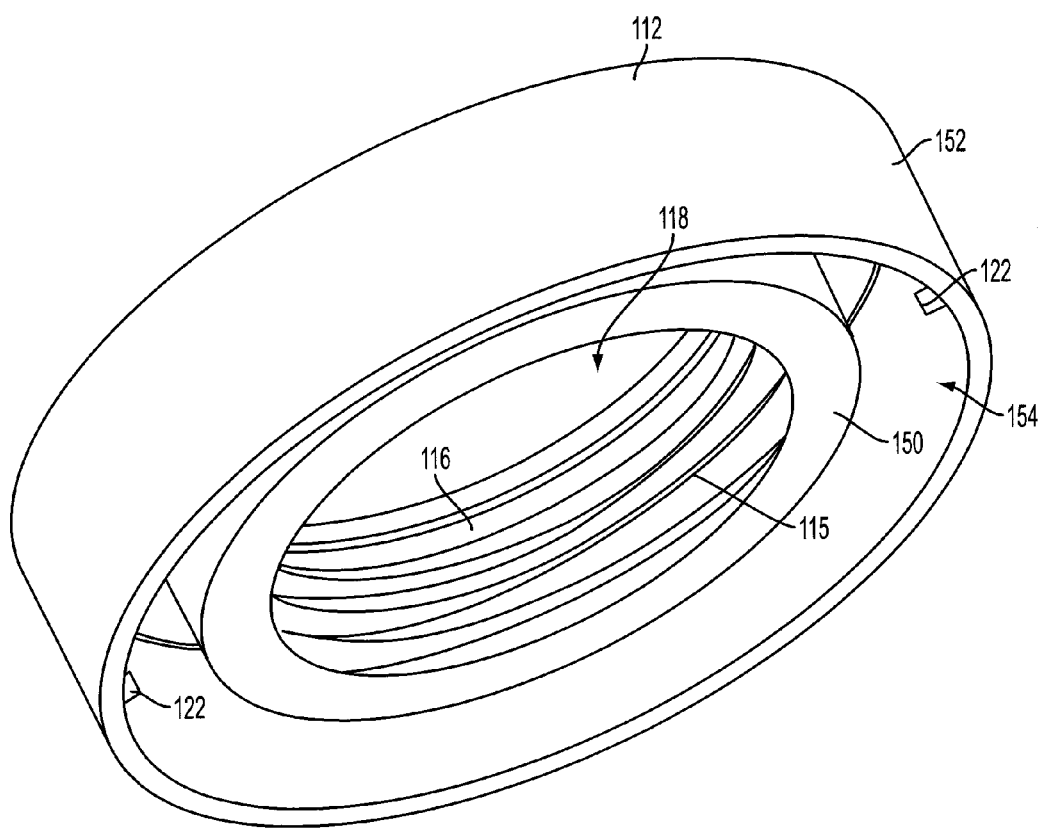
FIG. 8 is a perspective view of the first portion of the flexible mount of FIG. 1, according to various embodiments of the present disclosure.
Figure 9:
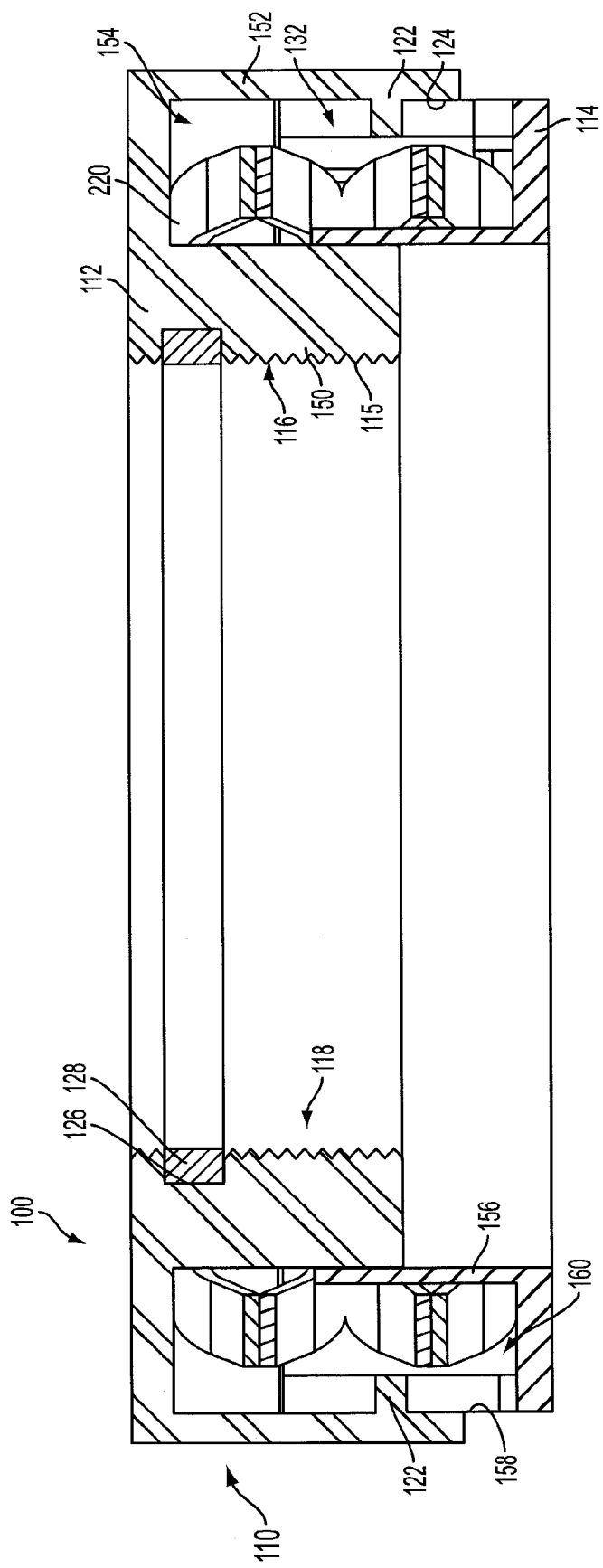
FIG. 9 is a sectional elevation view of the flexible mount of FIG. 1 taken along the plane 5-5 in FIG. 3, depicting the wave spring of FIG. 7 positioned within the casing, according to various embodiments of the present disclosure.
Figure 10:
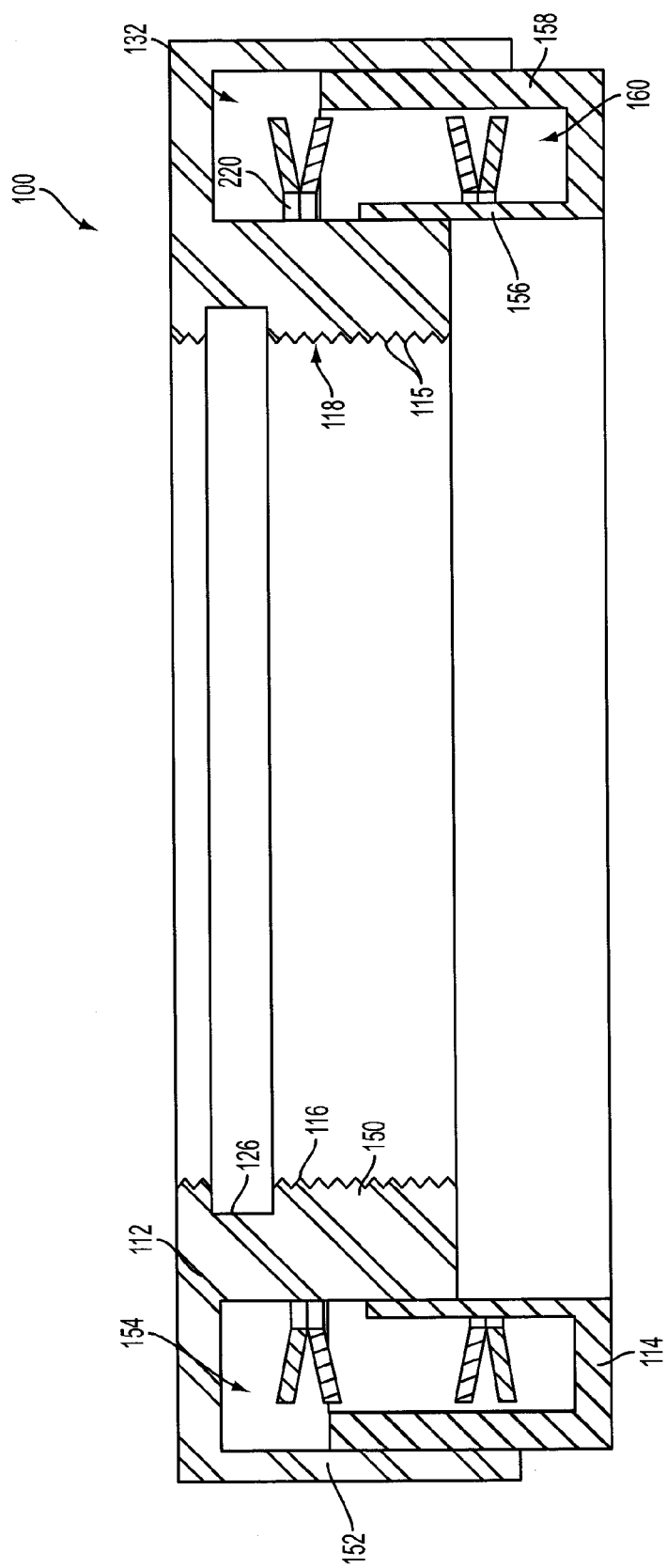
FIG. 10 is another sectional elevation view of the flexible mount of FIG. 3 taken along a plane 10-10 in FIG. 3, depicting the wave spring of FIG. 7 positioned within the casing, according to various embodiments of the present disclosure.
Figure 11:
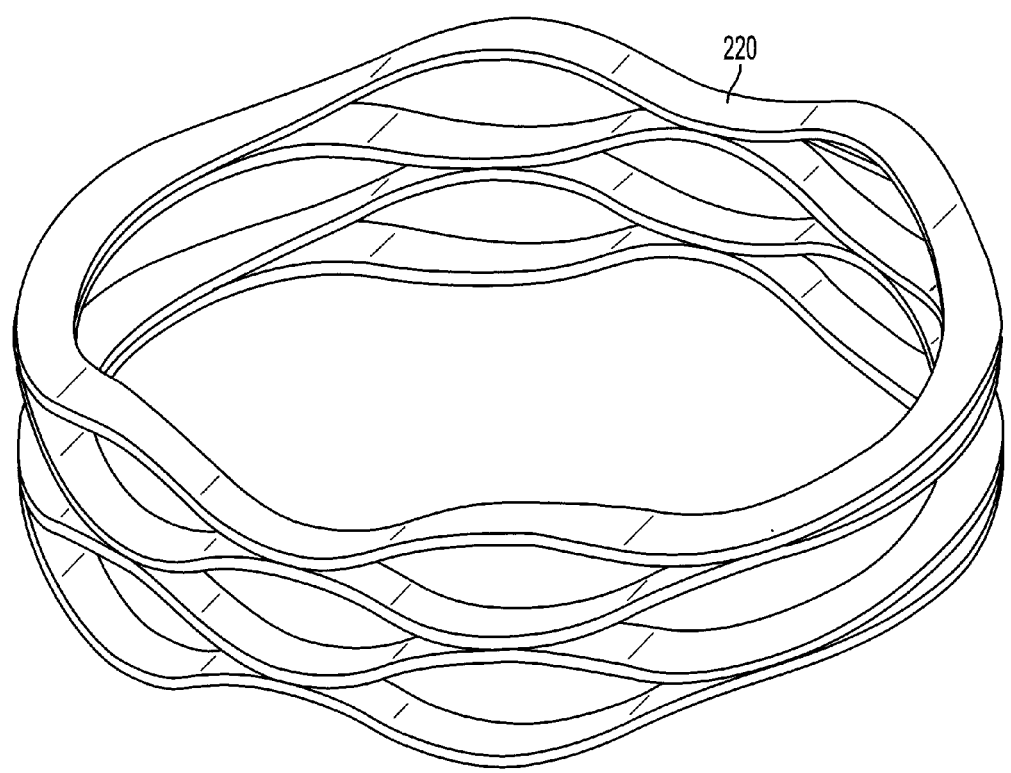
FIG. 11 is a perspective view of the wave spring of FIG. 7, according to various embodiments of the present disclosure.
Figure 12:
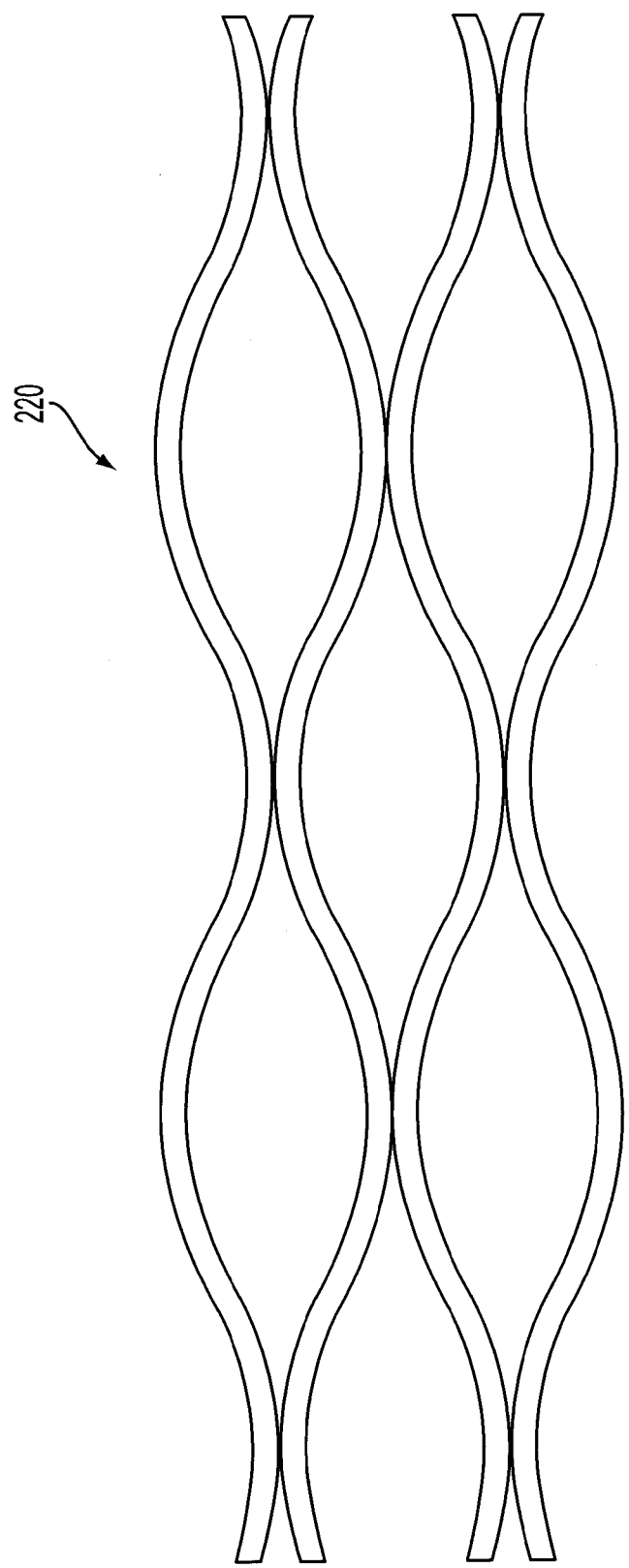
FIG. 12 is an elevation view of the wave spring of FIG. 7, according to various embodiments of the present disclosure.
Figure 13:
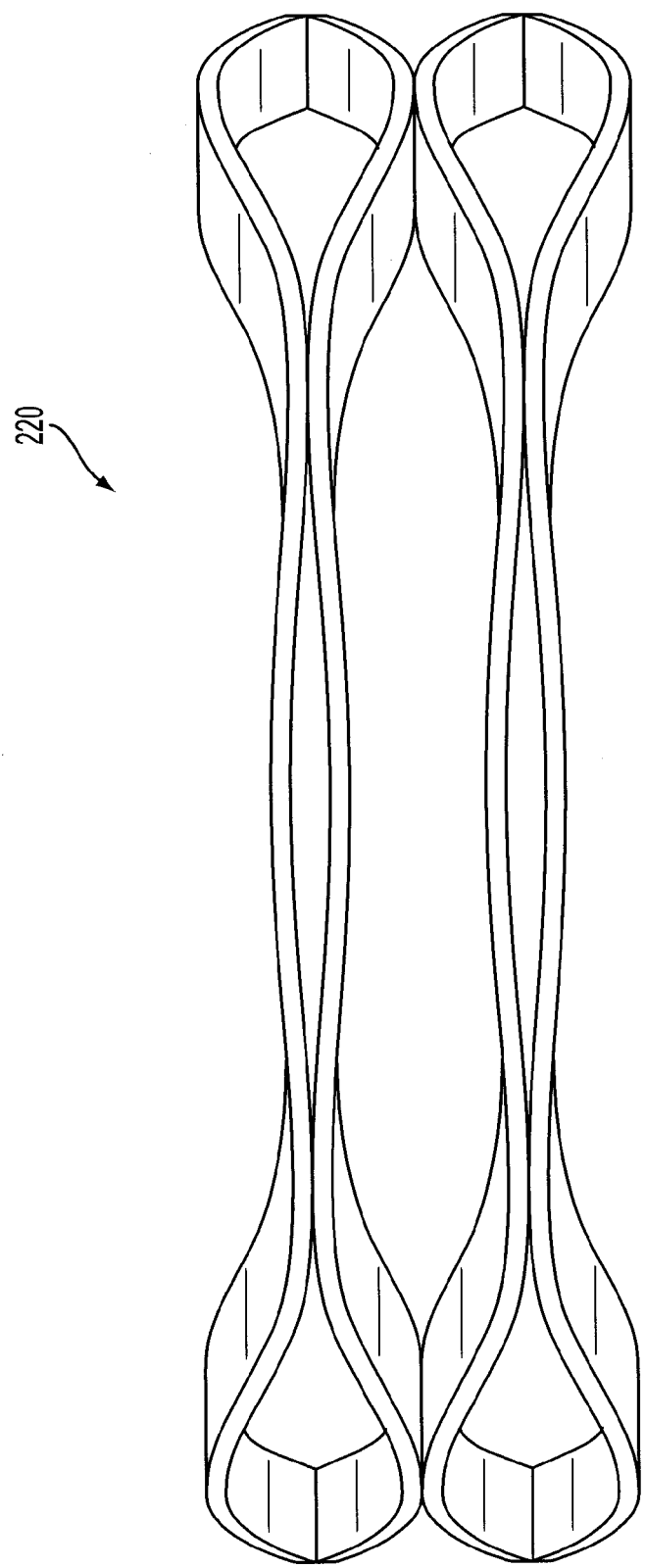
FIG. 13 is another elevation view of the wave spring of FIG. 7, according to various embodiments of the present disclosure.

Referring primarily to FIG. 8, the first part 112 of the depicted casing 110 comprises an annular or ring-like shape. In such instances, the first part 112 comprises an annular inside wall 150 and an annular outside wall 152. Additionally, an annular space 154 is defined between the annular inside wall 150 and the annular outside wall 152. Referring now to FIG. 9, the depicted second part 114 also comprises an annular or ring-like shape. In such instances, the second part 114 comprises an annular inside wall 156 and an annular outside wall 158. An annular space 160 is defined between the annular inside wall 150 and the annular outside wall 152, which can accommodate the biasing element, such as the compression spring 120 (FIGS. 4-6) or the wave spring 220 (FIGS. 7 and 9-13), for example.

In various instances, the first part 112 is dimensioned and structured to fit around, encircle, and/or partially enclose the second part 114. More particularly, referring primarily to FIGS. 9 and 10, for example, the annular inside wall 156 and the annular outside wall 158 of the second part 114 are configured to fit between the annular inside wall 150 and the annular outside wall 152 of the first part 112. A cavity 132 (FIGS. 5 and 6) is defined by the annular spaces 154, 160 between the first part 112 and the second part 114, respectively, and the spring 120 (FIG. 4-6) or 220 (FIGS. 7, 9-13) is dimensioned and structured to fit within the cavity 132.

The first part 112 and the second part 114 of the casing 110 can be connected by a bayonet mount or connection. More particularly, either the first part 112 or the second part 114 can include a pin, for example, and the other of the first portion or the second part 114 can include a bayonet slot, for example. In various instances, the pin can move within the bayonet slot to secure the first part 112 and the second part 114 together, while permitting the first part 112 to move between an expanded position and a retracted position relative to the second part 114. For example, the first and/or second portions 112, 114 can rotate and translate relative to each other 112, 114 to move a pin along a substantially "U"-shaped bayonet slot to facilitate attachment of the first and second portions 112, 114.

In the embodiment depicted in FIG. 8, the first part 112 of the casing 110 includes a pin 122, for example. The pin 122 depicted in FIG. 8 protrudes radially inward from the annular outside wall 152 into the annular space 154. Additionally, the second part 114 of the casing 110 depicted in FIG. 7 includes a bayonet slot 124, which is structured and dimensioned to receive the pin 122. In various instances, the casing 110 can be secured with a pair of bayonet slots 124 and a pair of pins 122, which can be equidistantly-spaced around the perimeter casing 110. In other instances, the casing 110 can include less than two bayonet mounts and/or more than two bayonet mounts.

Figure 4:
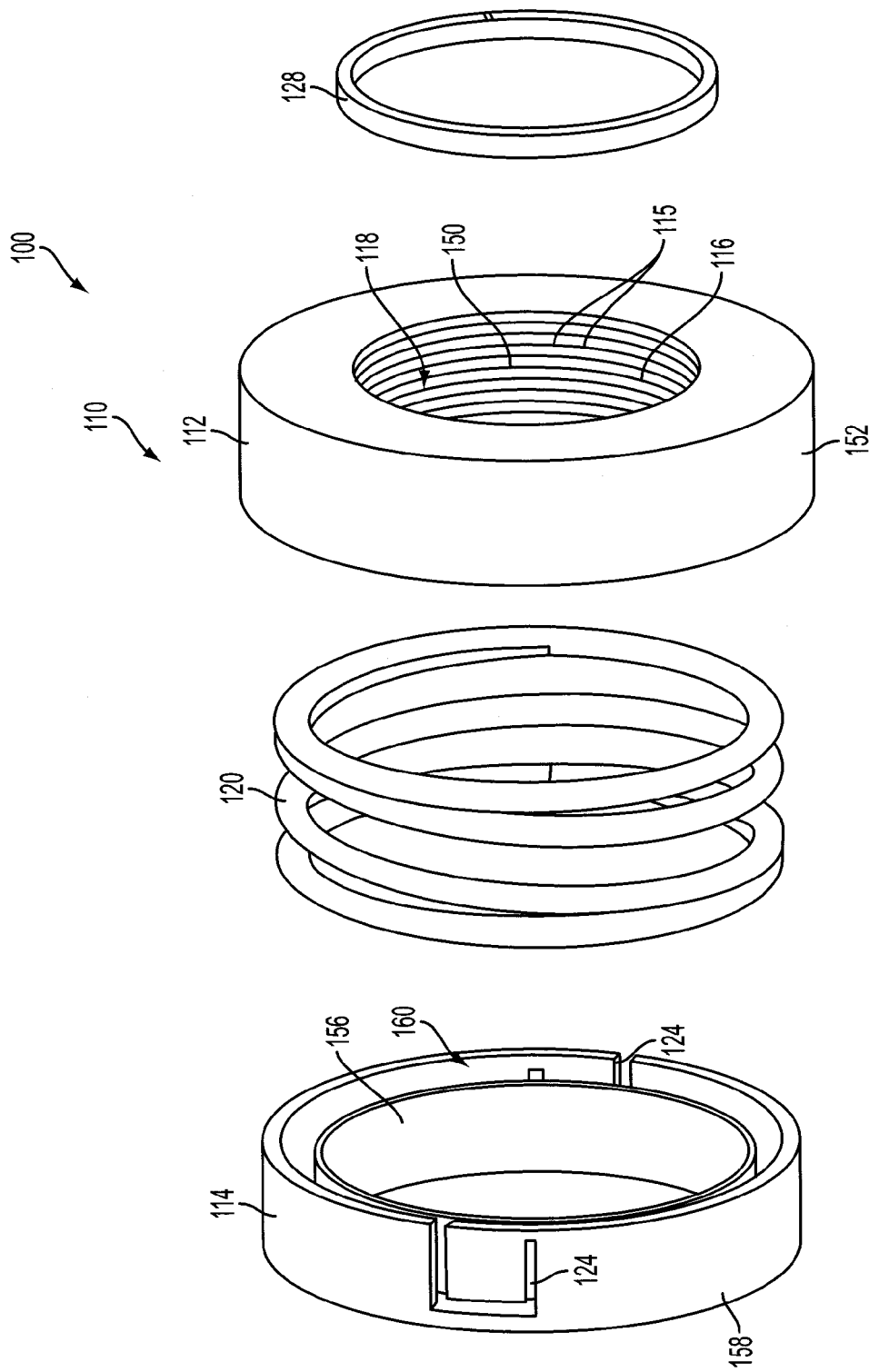
FIG. 4 is an exploded perspective view of the flexible mount of FIG. 1, depicting a casing having a first portion and a second portion, and further depicting a compression spring and a locking ring, according to various embodiments of the present disclosure.
Figure 5:
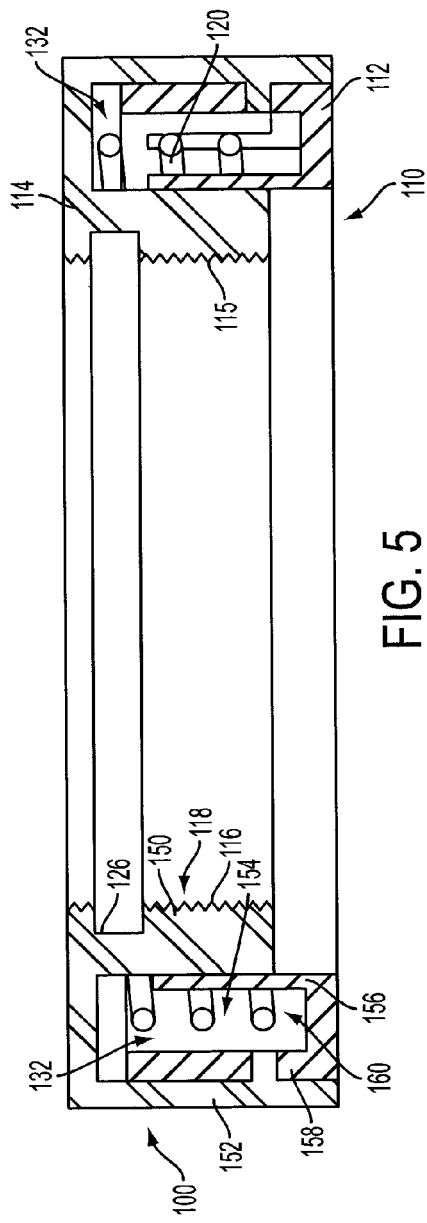
FIG. 5 is a sectional elevation view of the flexible mount of FIG. 1 taken along a plane 5-5 depicted in FIG. 3, depicting the flexible mount in a retracted configuration, according to various embodiments of the present disclosure.
Figure 6:
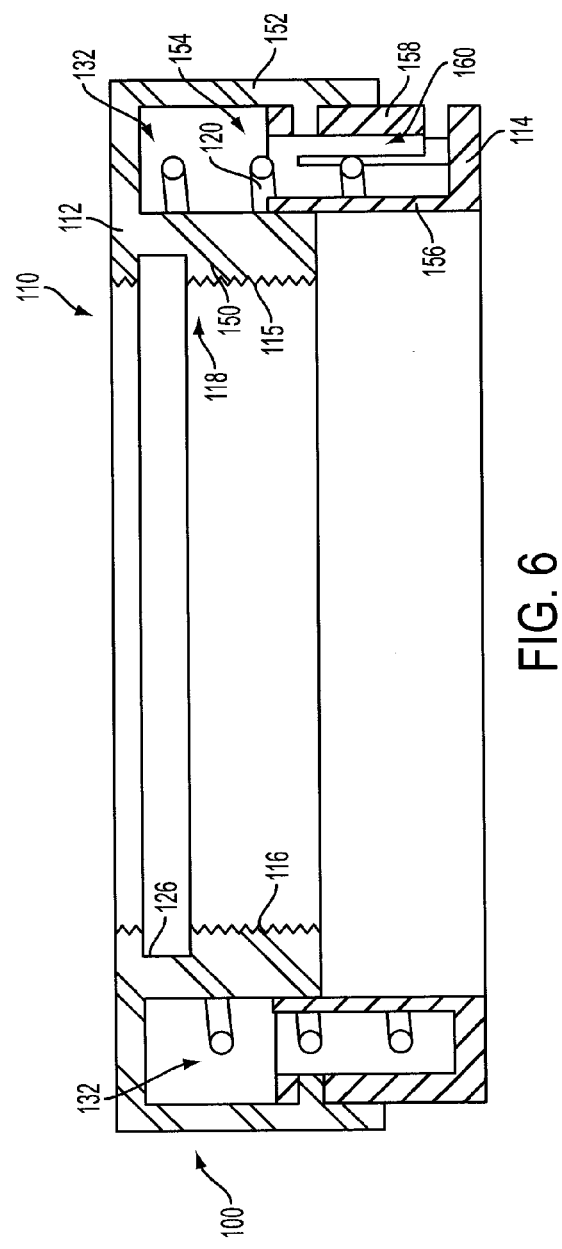
FIG. 6 is a sectional elevation view of the flexible mount of FIG. 1 taken along the plane 5-5 depicted in FIG. 3, depicting the flexible mount in an expanded configuration, according to various embodiments of the present disclosure.
Figure 7:
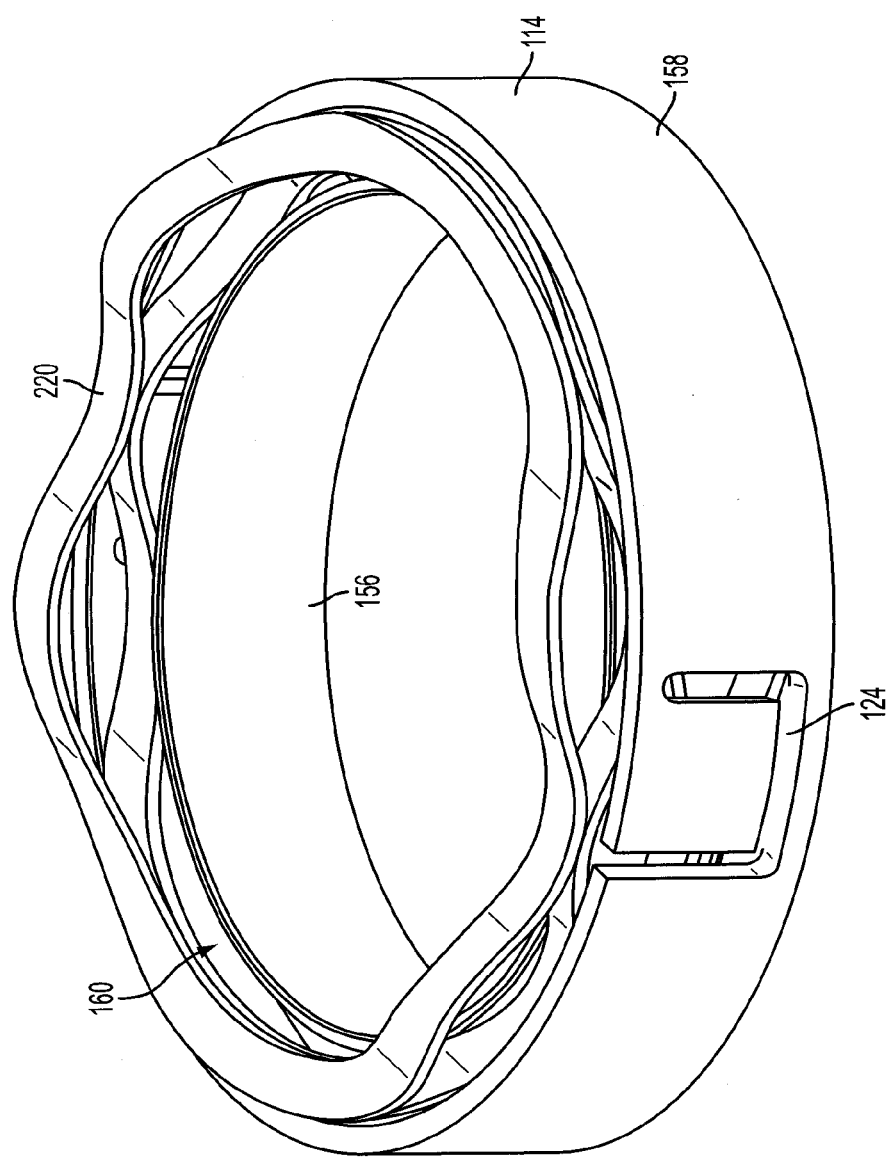
FIG. 7 is a perspective view of the second portion of the flexible mount of FIG. 1, depicting a wave spring positioned within the second portion, according to various embodiments of the present disclosure.

In various instances, the first part 112 of the casing 110 can be threadably attached to the proximity sensor 102. For example, referring to the embodiments depicted in FIGS. 1-10, the annular inside wall 150 of the first part 112 includes the interior threaded region 118. Referring primarily to FIGS. 5, 6, 9, and 10, an annular groove 126 is depicted in the inner surface 116 of the first part 112 of the casing 110. The annular groove 126 can extend around the inside perimeter of the first part 112. In various instances, the flexible mount 100 can further include a locking ring 128 (FIGS. 4 and 9). For example, the groove 126 can be dimensioned and structured to receive the locking ring 128. In various instances, when the proximity sensor 102 is threadably engaged with the casing 110, the sensor 102 can exert an outward, expansive force on the locking ring 128, which can resist rotational decoupling of the proximity sensor 102 and the casing 110.

As described in greater detail herein, in the depicted embodiment, the first part 112 of the casing 110 comprises the threads 115, which threadably engaged with the sensor 102. In such instances, the second part 114 of the casing 110 can be fixed to the support 140, for example, and the second part 112 of the casing 110, which supports the sensor 102, can be configured to move or shift relative to the support 140. In other words, the sensor-supporting portion 112 of the casing 110 can be configured to move or shift relative to the portion 114 of the casing 110 that is fixed to the support 140. As a result of the depicted arrangement, the sensor 102 is indirectly secured to the support 140 via the flexible sensor mount 100.

As described in greater detail herein, a biasing element, such as the coil spring 120 (FIGS. 4-6) or the wave spring 220 (FIGS. 7 and 9-13), for example, can be positioned within the casing 110. In certain instances, multiple biasing elements can be positioned within the casing 110. For example, two or more coil springs 120 can be positioned within the casing 110. Referring primarily to FIGS. 9-13, the wave spring 220 can be positioned within the casing 110.

In various instances, the wave spring 220 can comprise a flattened and/or flat wire. For example, a first dimension of the wire, i.e., the height, can be less than a second dimension of the wire, i.e., the width. The flat wire can be oriented such that the wave spring 220 is compressible in the direction of the shorter dimension, i.e., the height. As a result, when the wave spring 220 is fully compressed, the wave spring 220 can define a shorter total height compared to a spring in which the height of the wire is greater, such as if the height of the wire is equal to the width of the wire, for example. In certain instances, the geometry of the wave spring 220 can generate a greater spring back or restoring force with less total height than a coil spring, for example.

In use, the sensor 102 can be positioned through the aperture 142 in the support 140. The hex nut 130 can threadably engage the sensor 102 on the first side of the support 140, and the casing 110 of the flexible mount 100 can threadably engage the sensor 102 on the second, opposite side 146 of the support 140. Accordingly, the flexible mount 100 is positioned entirely on one side of the support 140 and is not positioned within the aperture 142 of the support 140. Rather, in the depicted arrangement, only the sensor 102 is positioned though the aperture 142 in the support 140, and thus, a standard-size sensor 102 and support 140 can be used. In certain instances, the sensor 102 can be further secured relative the support 140 via the locking ring 128 and/or a fastener through the aperture 142 (FIG. 10) in the second part 114 of the casing 110. The first part 112 of the depicted casing 110 supports the sensor 102 such that the sensor 102 is indirectly mounted to the support 140.

For example, the first part 112 of the casing 110 can be configured to move or shift relative to the second part 114 of the casing 110. Additionally, a biasing element, such as the spring 120 or 220, for example, within the casing 110 can be compressed as the first part 112 moves toward the second part 114. For example, when an object collides or otherwise moves into abutting contact with the sensor 102, the first part 112 of the casing 110 can freely shift within a predefined range of motion. In various instances, the range of motion of the first part 112 relative to the second part 114 can be defined by the pin 122 (FIG. 8) and slot 124 (FIG. 7), the biasing element, and/or the geometry of the parts 112, 114. As the first part 112 moves relative to the second part 114, the biasing element can be compressed within the casing 110. Additionally, when the object moves out of engagement with the sensor 102, the first part 112 of the casing 110 can rebound or move away from the second portion, and the spring 120, 220 can expand or otherwise return to its initial, undeformed configuration, for example.

Figure 14:
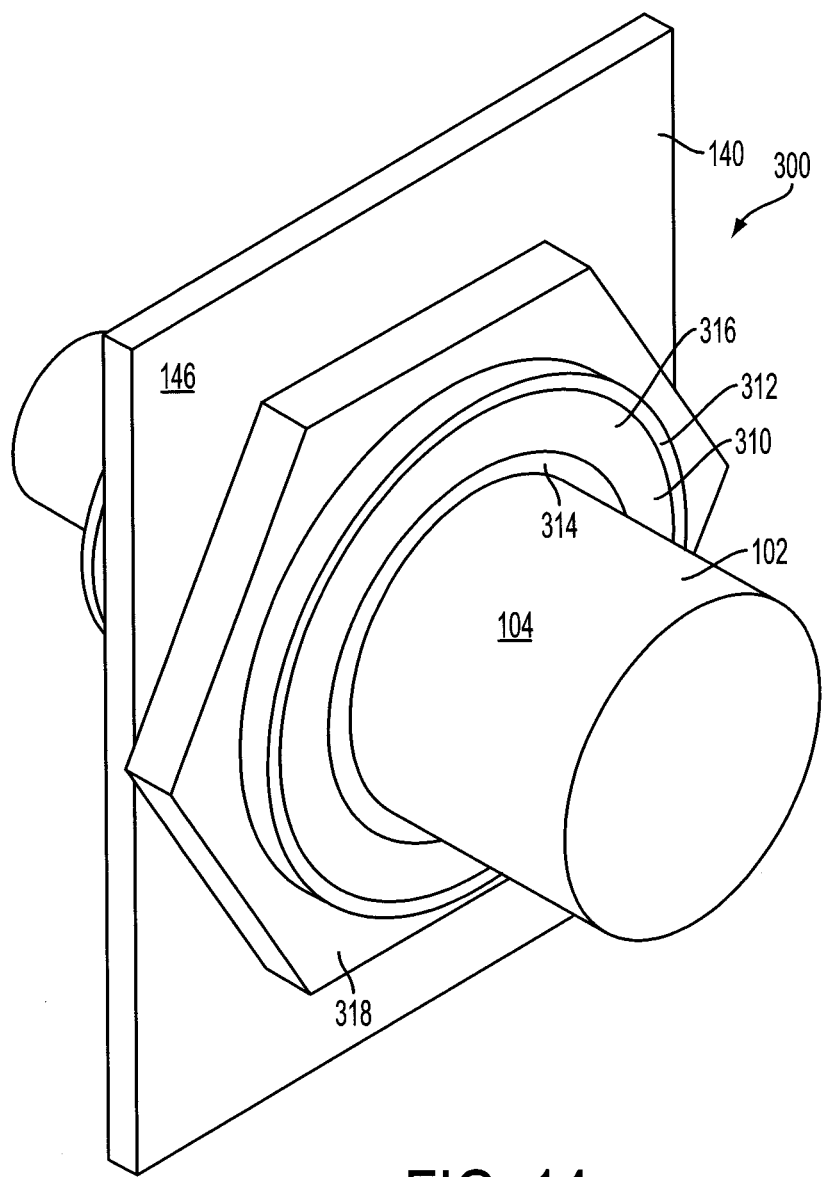
FIG. 14 is a perspective view of a flexible mount and the sensor and the support of FIG. 1, according to various embodiments of the present disclosure.
Figure 15:
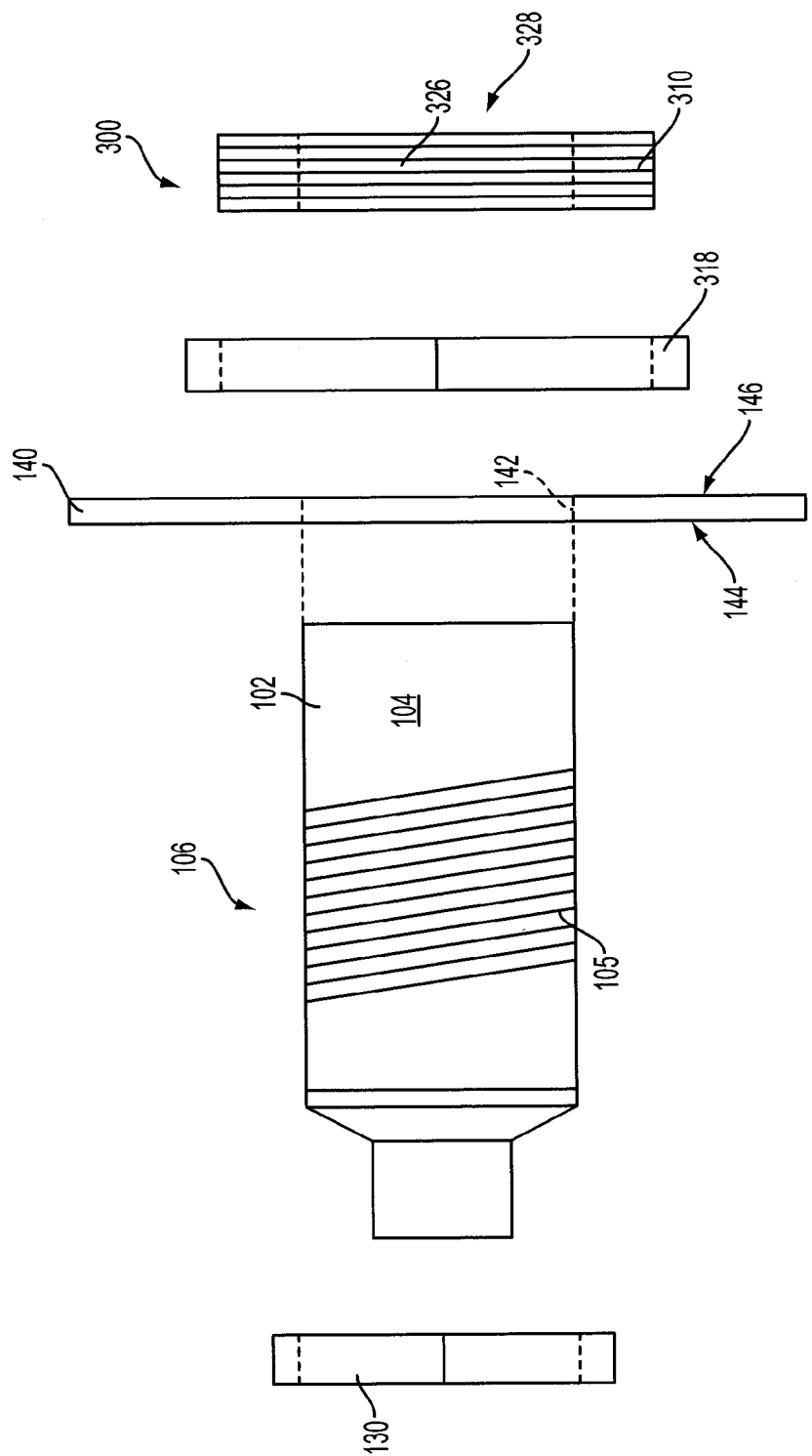
FIG. 15 is an exploded perspective view of the flexible mount, the sensor, and the support of FIG. 14, according to various embodiments of the present disclosure.

Referring now to FIGS. 14-20, a sensor mount 300 and various components and subassemblies thereof are depicted. Referring to FIGS. 14 and 15, the sensor mount 300 can secure the sensor 102 to the support 140. As described in greater detail herein, the sensor 102 can float or shift relative to the support 140. For example, if an object collides with the sensor 102, at least a portion of the sensor mount 300 can flex and rebound to absorb the impact or at least a portion of the impact from the collision. As the sensor mount 300 flexes and rebounds, the sensor 102 attached thereto can shift within a predefined range of motion relative to the support 140.

Figure 16:
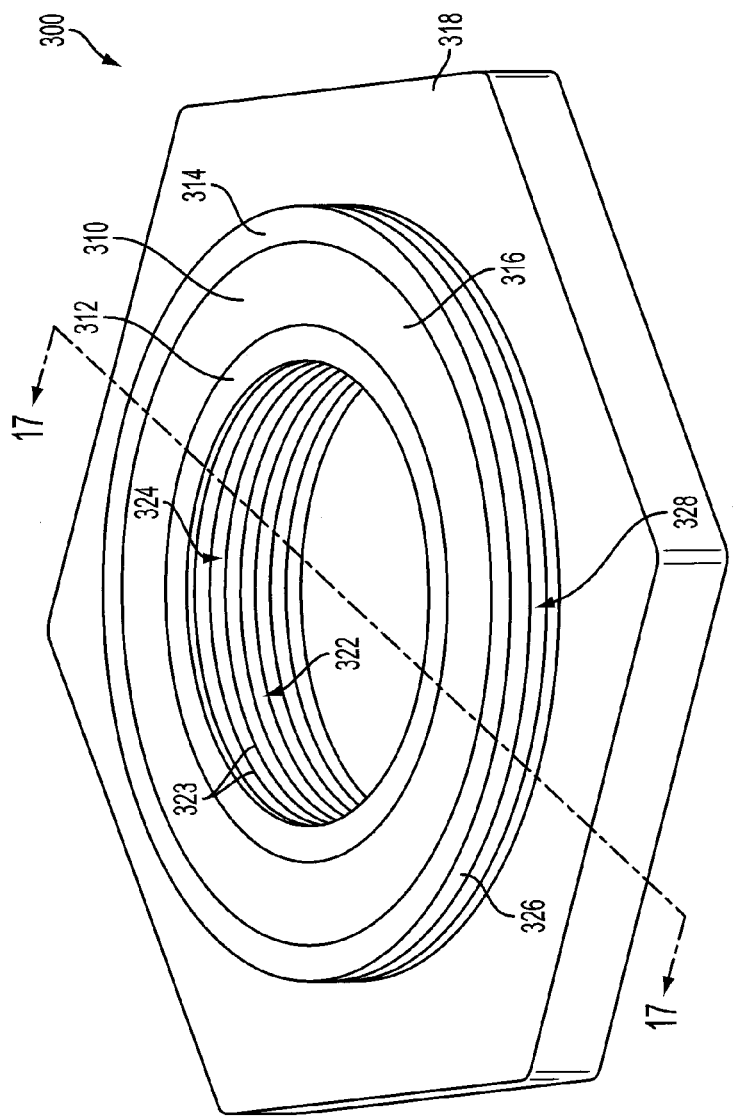
FIG. 16 is a perspective view of the flexible mount of FIG. 14, wherein the flexible mount includes a sleeve and a sleeve nut, wherein the sleeve includes an inner portion, an outer portion, and an elastomeric member intermediate the inner portion and the outer portion, according to various embodiments of the present disclosure.

Referring primarily to FIG. 16, the flexible mount 300 includes an inner surface 322 having a plurality of threads 323. In the depicted embodiments, the threads 323 on the inner surface 322 form an interior threaded region 324. In various instances, the interior threaded region 324 can be dimensioned and structured to threadably engage the proximity sensor 102. For example, the exterior threaded region 106 of the depicted proximity sensor 102 is configured to threadably engage the interior threaded region 324 of the flexible mount 300.

The sensor 102 shown in FIGS. 14 and 15 is configured to fit within the aperture 142 in the support 140. The hex nut 130 can threadably engage the sensor 102 on a first side 144

(FIG. 15) of the support 140. For example, the hex nut 130 can directly engage the exterior threaded region 106 of the sensor 102. Referring still to FIGS. 14 and 15, the flexible mount 300 can threadably engage the sensor 102 on the second, opposite side 146 of the support 140, for example. In various instances, the exterior threaded region 106 can be continuous and can threadably engage the hex nut 130 and the mount 300. In other instances, the exterior threaded region 106 can be broken between the nut-engaging threads and the mount-engaging threads, for example.

In various instances, the flexible mount 300 can comprise a sleeve 310 and a sleeve nut 318. The sleeve 310 depicted in FIGS. 14-17 includes an inside portion 312, an outside portion 314, and an elastomeric element 316 intermediate the inside portion 312 and the outside portion 314. In various instances, the inside portion 312, the outside portion 314 and the elastomeric element 314 can be annular and/or ring-shaped. In such instances, referring to the sleeve 310 shown in FIGS. 14-17, the inside portion 312, the outside portion 314 and the elastomeric element 316 can comprise nesting or concentric rings, for example.

In various instances, the inside portion 312 of the sleeve 310 can be configured to engage the proximity sensor 102. For example, the inside portion 312 depicted in FIG. 20, for example, comprises the inner surface 322 having the threads 323. The threads 323 can form the inner threaded region 324, which is configured to threadably engage the exterior threaded region 106 of the sensor 102. In various instances, the outside portion 314 of the sleeve 310 can be configured to engage the sleeve nut 318. For example, the outside portion 314 depicted in FIG. 18, for example, comprises an outer surface 326 having threads 327. The threads 327 can form an exterior threaded region 328, which is configured to threadably engage the threads of the sleeve nut 318, for example.

The elastomeric element 316 can provide flexibility and/or elasticity to the sleeve 310. For example, the outside portion 314 can shift or move relative to the inside portion 312 as the elastomeric element 316 is deformed. In various instances, the elastomeric element 316 can be comprised of rubber, for example. Additionally or alternatively, the elastomeric element 316 can be comprised of a rubber-like material, such as silicone and/or latex, for example, and/or combinations thereof.

The inside portion 312 and/or the outside portion 314 of the sleeve 310 can comprise a rigid or substantially inflexible material. In certain instances, the inside portion 312 and/or the outside portion 314 of the sleeve 310 can be comprised of a metallic material, such as stainless steel, for example. Additionally or alternatively, the inside portion 312 and/or the outside portion 314 of the sleeve 310 can be comprised of a plastic material, for example.

In various instances, the inside portion 312, the outside portion 314, and the elastomeric element 316 can be press fit or friction fit together. For example, the inside portion 312, the outside portion 314, and the elastomeric element 316 can include corresponding tongues and grooves, which can secure the parts 312, 314, 316 together. For example, referring primarily to FIGS. 17 and 18, the outside portion 314 includes an annular tongue 315, which protrudes radially inward. In various instances, the annular tongue 315 extends around the inner diameter of the outside portion 314. The outside portion 314 depicted in FIGS. 17 and 18 includes a pair of annular tongues 315. In other instances, the outside portion 314 can include less than or more than two annular tongues 315.

Figure 17:
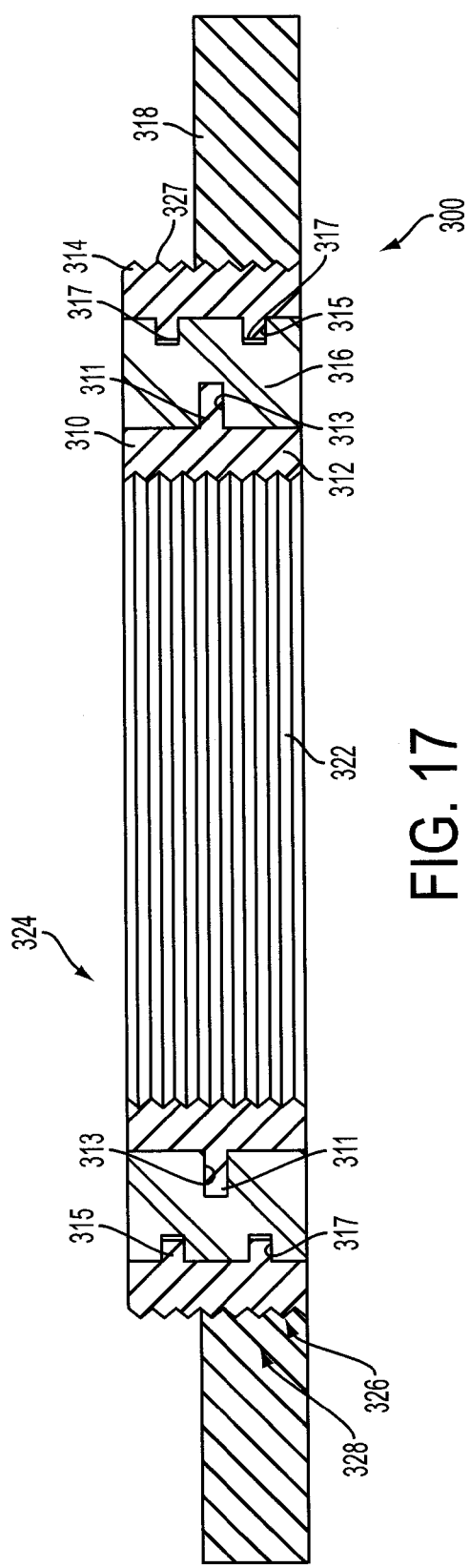
FIG. 17 is a sectional elevation view of the flexible mount of FIG. 14 taken along a plane 17-17 in FIG. 16, according to various embodiments of the present disclosure.
Figure 18:
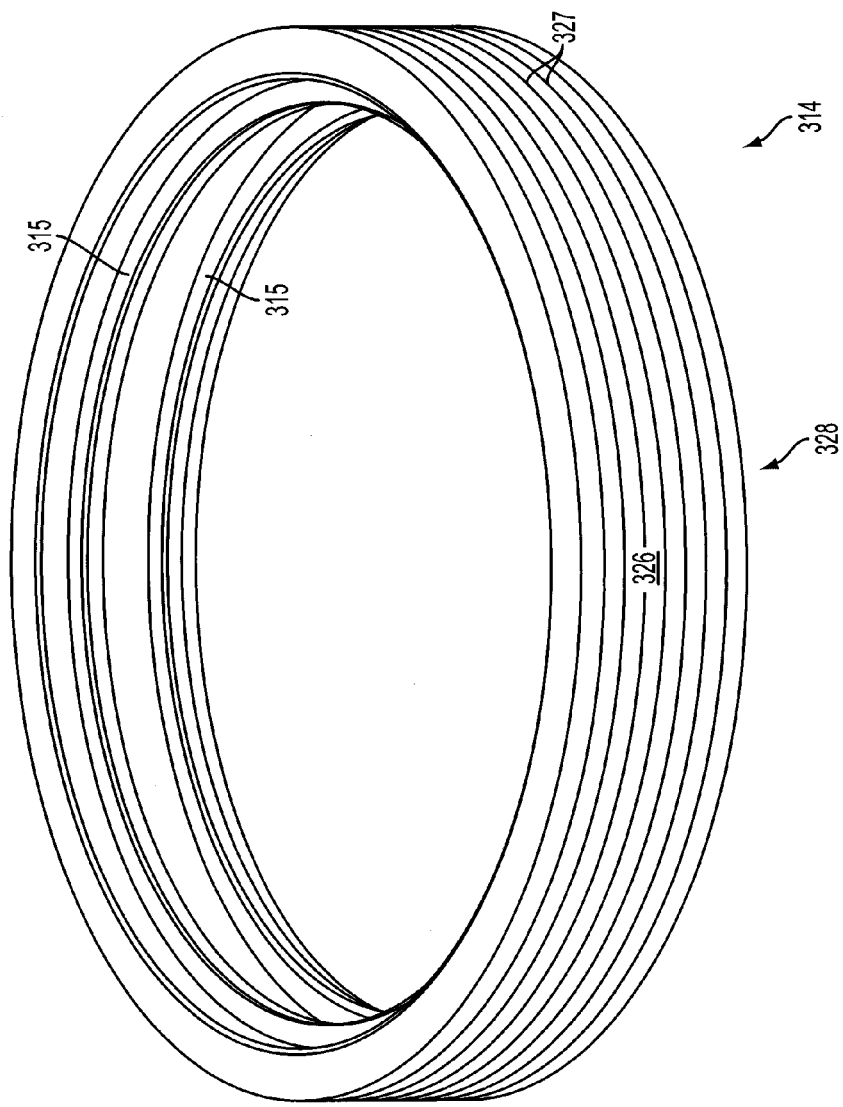
FIG. 18 is a perspective view of the outer portion of the flexible mount of FIG. 14, according to various embodiments of the present disclosure.
Figure 19:
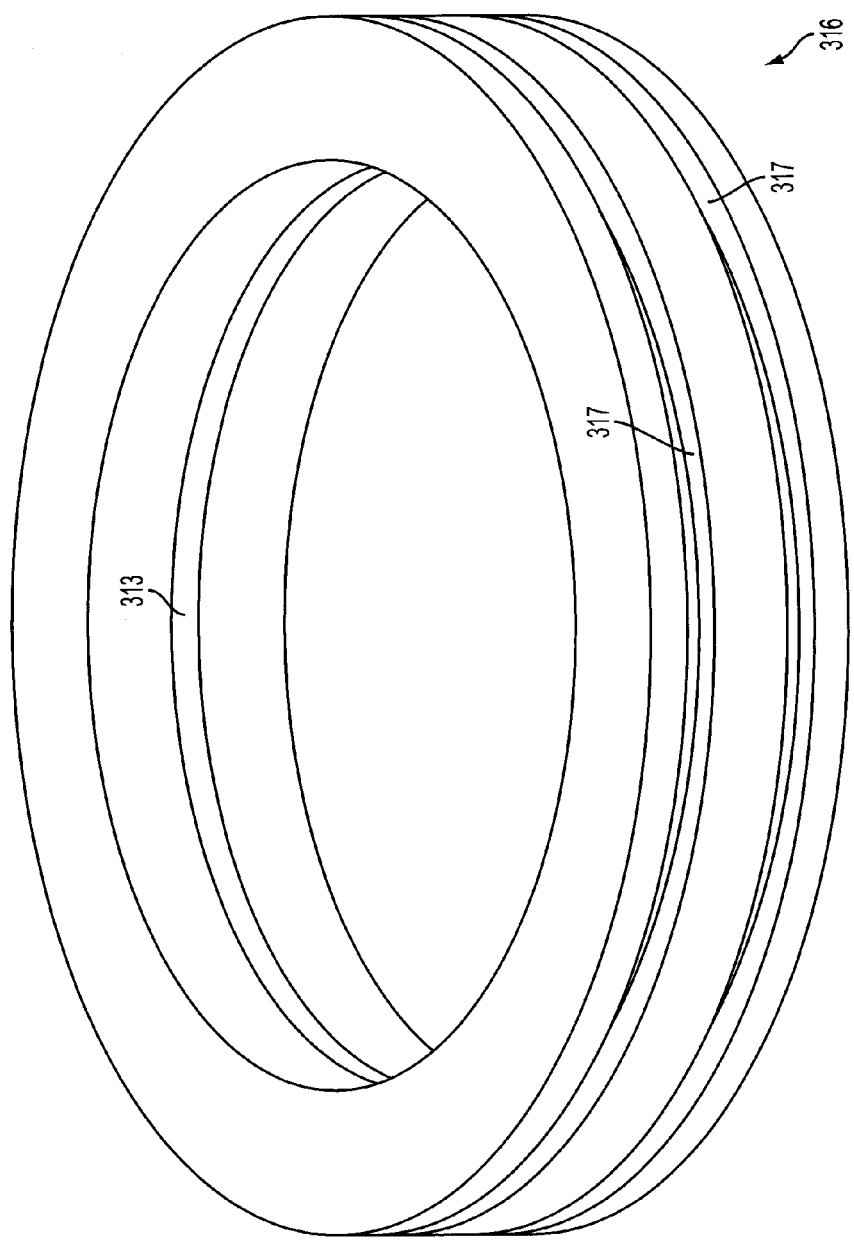
FIG. 19 is a perspective view of the elastomeric element of the flexible mount of FIG. 14, according to various embodiments of the present disclosure.

Referring now to FIGS. 17 and 19, the elastomeric element 316 includes an annular outside groove 317, which is defined radially inward into the elastomeric element 316. In various instances, the annular outside groove 317 extends around the outside diameter of the elastomeric element 316. The annular outside groove 317 can be configured to receive and hold an annular tongue 315 of the outside portion 314. For example, the elastomeric element 316 depicted in FIGS. 17 and 19 includes a pair of annular outside grooves 317, which are configured to receive and hold the pair of annular tongues 315 of the outside portion 314. The annular tongues 315 can be press fit or friction fit into the annular grooves 317 such that relative linear and rotational displacement of the outside portion 314 relative to the elastomeric element 316 is limited and/or prevented. Additionally or alternatively, the elastomeric ring 316 can include at least one tongue, and the outside portion 314 can include at least one groove, which can be dimensioned and structured to receive the elastomeric tongue.

Figure 20:
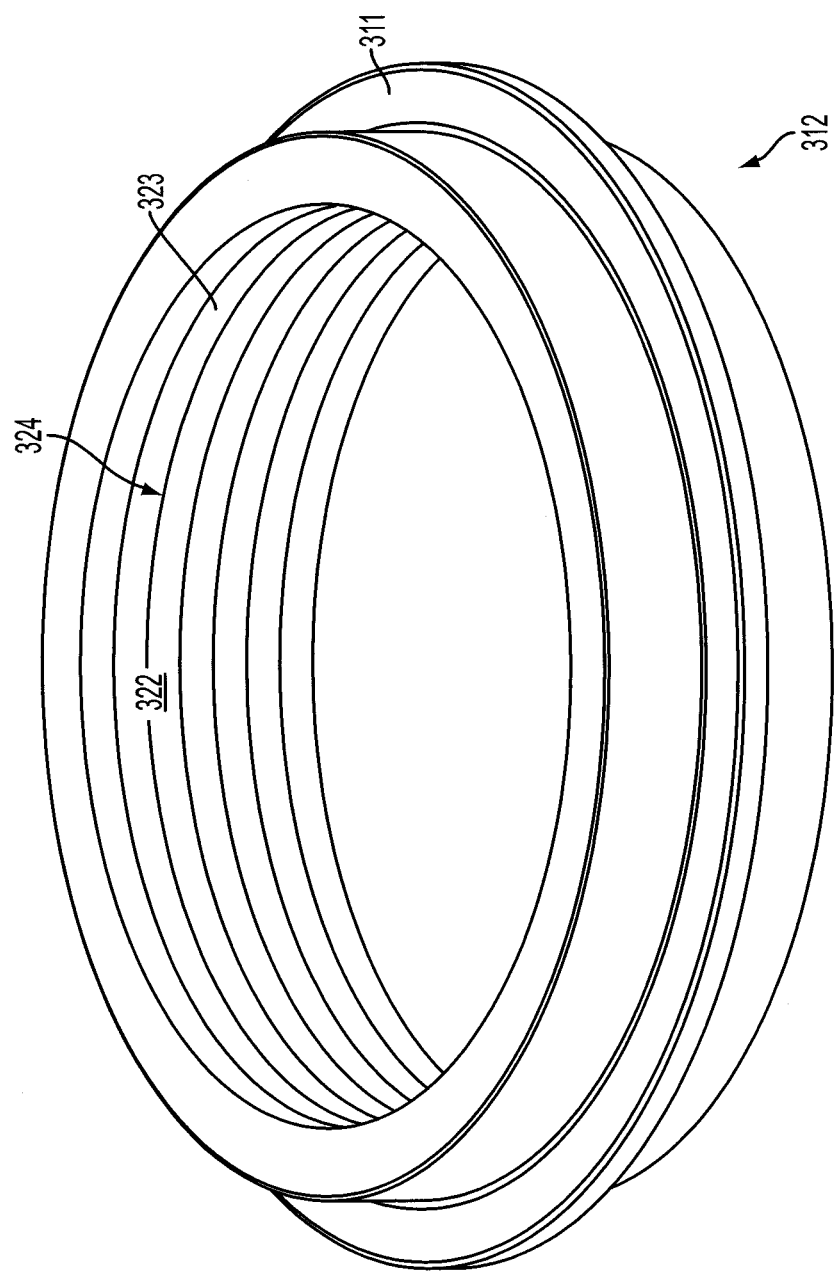
FIG. 20 is a perspective view of the inner portion of the flexible mount of FIG. 14, according to various embodiments of the present disclosure.

Referring now to FIGS. 17 and 20, the inside portion 312 includes an annular tongue 311, which protrudes radially outward. In various instances, the annular tongue 311 extends around the outside diameter of the inside portion 312. In other instances, the inside portion 312 can include two or more annular tongues 311, for example. Referring again to FIGS. 17 and 19, the elastomeric element 316 includes an annular inside groove 313, which is defined radially inward into the elastomeric element 316. In various instances, the annular inside groove 313 extends around the inside diameter of the elastomeric element 316. The annular inside groove 313 can be configured to receive and hold the annular tongue 311 of the inside portion 312. For example, the annular tongue 311 can be press fit or friction fit into the annular groove 313 such that relative linear and rotational displacement of the inside portion 312 relative to the elastomeric element 316 is limited and/or prevented. Additionally or alternatively, the elastomeric ring 316 can include at least one tongue, and the inside portion 312 can include at least one groove, which can be dimensioned and structured to receive the elastomeric tongue.

In various instances, the inside portion 312, the outside portion 314, and the elastomeric element 316 can form the unitary sleeve 310. For example, when the annular tongues 311, 315 are press fit into the annular grooves 313, 317, respectively, the sleeve 310 can comprise a one-piece assembly. Relative rotation and/or linear displacement of the various components 312, 314, 316 can be limited and/or prevented. Additionally, because the elastomeric element 316 is flexible, the sleeve 310 can be deformable and/or malleable within a predefined range of deformation. In some instances, adhesive and/or fasteners can be utilized in connection with the tongue and groove features or in lieu of the tongue and groove features to secure the inside portion 312, the outside portion 314, and the elastomeric element 316 of the sleeve 310. For example, adhesive can be applied between the inside portion 312 and the elastomeric element 316 and/or between the outside portion 314 and the elastomeric element 316.

In use, referring primarily to FIGS. 14 and 15, the sensor 102 can be positioned through the aperture 142 in the support 140. The depicted hex nut 130 is configured to threadably engage the sensor 102 on the first side 144 (FIG. 15) of the support 140, and the depicted sleeve 310 of the flexible mount 300 is configured to threadably engage the sensor 102 on the second side 146 of the support 140. In the depicted arrangement, the inside portion 312 of the sleeve 310 is configured to support the sensor 102 such that the sensor 102 is mounted to the support 140. In various instances, the sleeve nut 318 threadably engages the outside portion 314 of the sleeve 310.

In the depicted arrangement, the sensor 102 extends through the support 140 and is held in position via the hex nut 130 on the first side 144 (FIG. 15) of the support 140, and the sleeve 310 and the sleeve nut 318 on the second side 146 of the support 140. Accordingly, the flexible mount 300 is positioned entirely on one side of the support 140 and is not positioned within the aperture 142 of the support 140. Rather, in the depicted arrangement, only the sensor 102 is positioned though the aperture 142 in the support 140, and thus, a standard-size sensor 102 and support 140 can be used, and no additional drilling of the aperture 142 is needed. The sensor 102 can be held in position between the sleeve 310 and the hex nut 130. Additionally, the sleeve 310 can be configured to deform or flex to accommodate shifting and/or movement of the sensor 102 relative to the support 140.

For example, when an object collides or otherwise moves into abutting contact with the sensor 102, the elastomeric element 316 of the sleeve 310 can be deformed within a predefined range of deformation. As the elastomeric element 316 is deformed, the sensor-supporting inner portion 312 of the sleeve 310 can shift to move or shift the sensor 102. When the object moves out of engagement with the sensor 102, the elastomeric element 316 can rebound and expand or otherwise return to its initial configuration, for example.

Referring now to FIGS. 21-26, a flexible nut 410 and various components thereof are depicted. The flexible nut 410 can be used to secure a sensor, such as the sensor 102 (FIGS. 1, 2, 14 and 15), for example, to a support, such as the support 140 (FIGS. 1, 2, 14 and 15). In various instances, the flexible nut 410 can be used in lieu of the flexible mount 300 depicted in FIGS. 14-17 and/or the flexible mount 100 depicted in FIGS. 1-6, 9 and 10. As described in greater detail herein, the sensor 102 can float or shift relative to the support 140. For example, if an object collides with the sensor 102, the flexible nut 410 can flex and rebound relative to the support 140 to absorb the impact or at least a portion of the impact from the collision.

Referring primarily to FIGS. 21-23 and 26, the flexible nut 410 includes an inner surface 422 having threads 423. The threads 423 on the inner surface 422 form an interior threaded region 424, which is dimensioned and structured to threadably engage the proximity sensor 102. For example, the exterior threaded region 106 (FIGS. 1, 2, 14 and 15) of the proximity sensor 102 is configured to threadably engage the interior threaded region 424 of the flexible nut 410.

Figure 21:
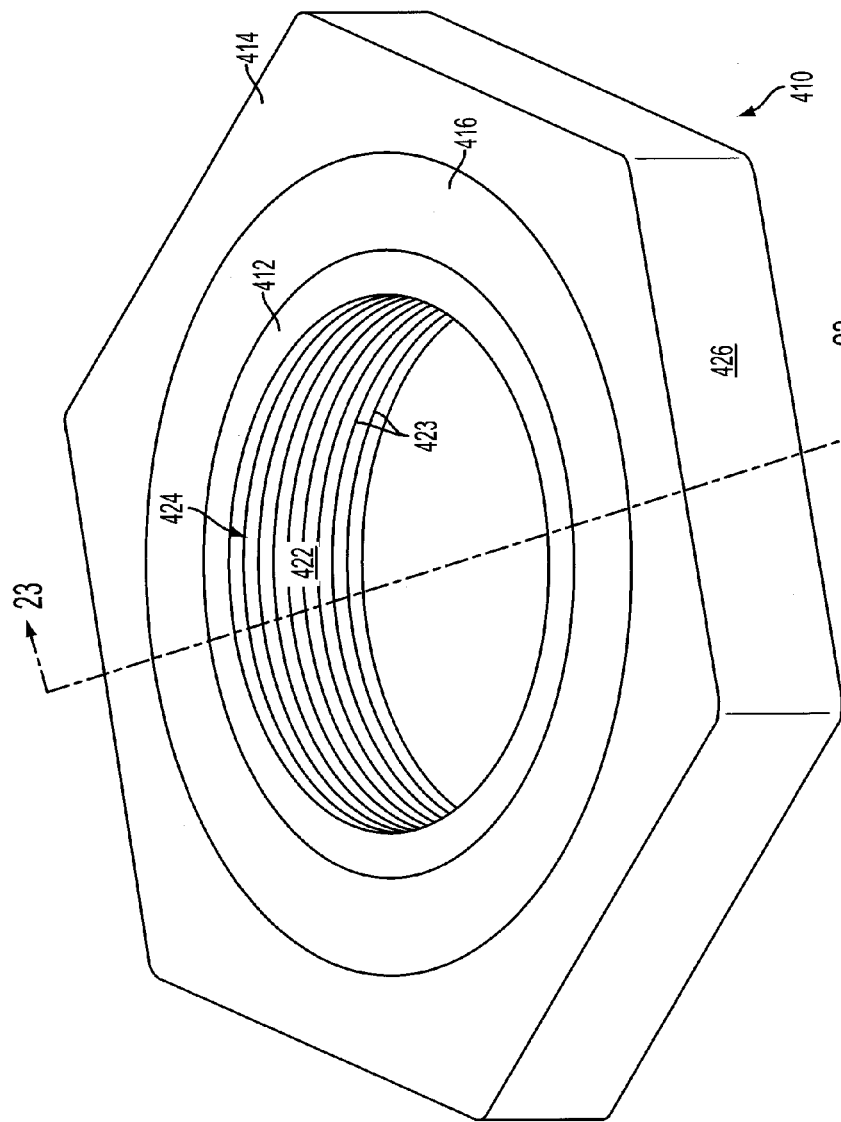
FIG. 21 is a perspective view of a flexible nut including an outer portion, an inner portion, and an elastomeric element intermediate the outer portion and the inner portion, according to various embodiments of the present disclosure.
Figure 22:
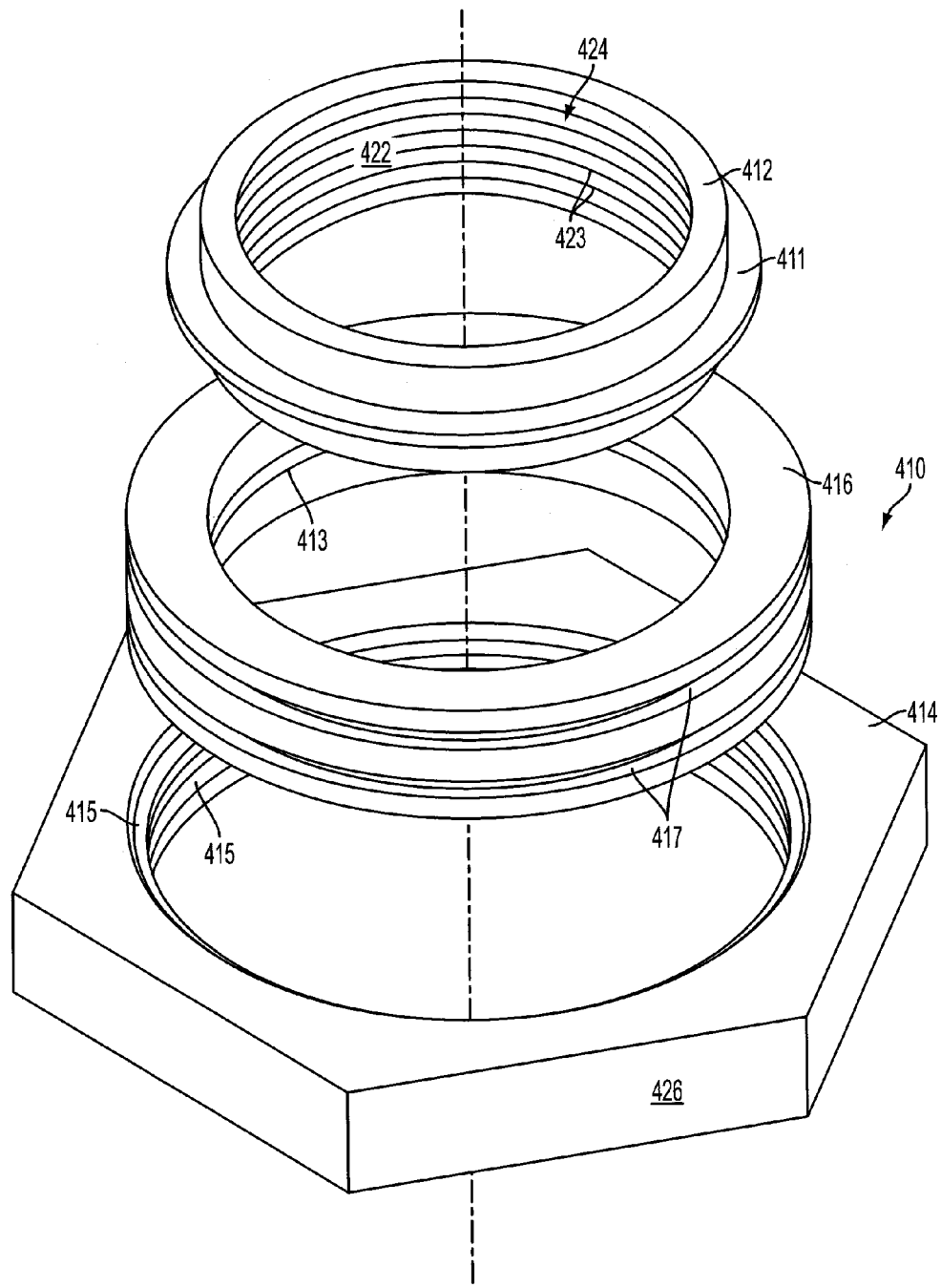
FIG. 22 is an exploded perspective view of the flexible nut of FIG. 21, according to various embodiments of the present disclosure.
Figure 23:
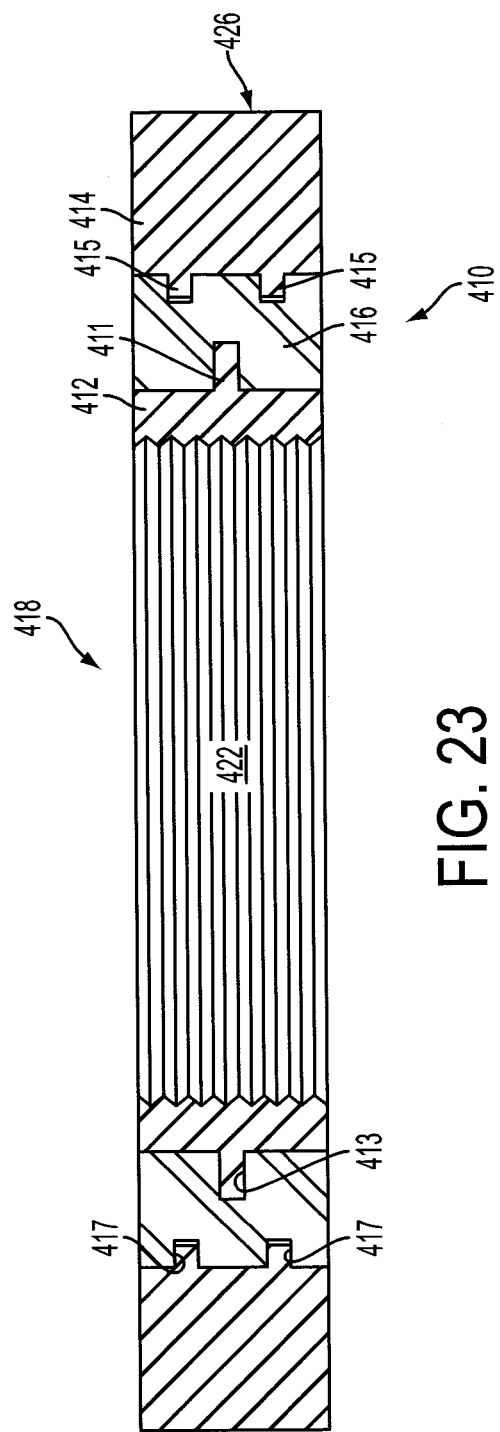
FIG. 23 is a sectional elevation view of the flexible mount of FIG. 21 taken along a plane 23-23 depicted in FIG. 21, according to various embodiments of present disclosure.
Figure 24:
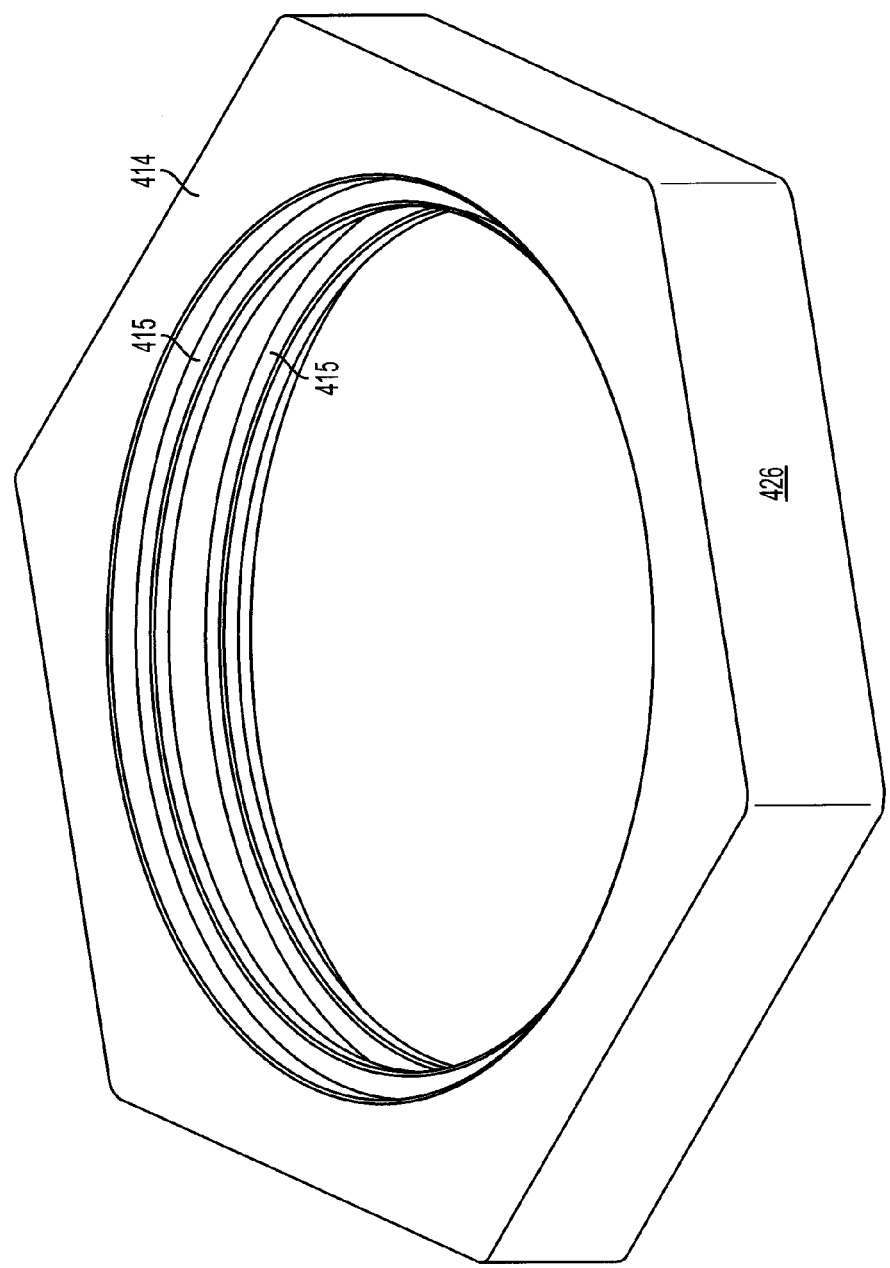
FIG. 24 is a perspective view of the outer portion of the flexible nut of FIG. 21, according to various embodiments of the present disclosure.

The flexible nut 410 depicted in FIGS. 21-23 includes an inside portion 412, an outside portion 414, and an elastomeric element 416 intermediate the inside portion 412 and the outside portion 414. In various instances, the inside portion 412, the outside portion 416 and the elastomeric element 412 can be annular and/or ring-shaped. In such instances, the inside portion 412, the outside portion 414 and the elastomeric element 416 can comprise nesting or concentric rings, for example.

In various instances, the inside portion 412 of the flexible nut 410 can be configured to engage the proximity sensor 102. For example, referring to the embodiments depicted in FIGS. 21-26, the inside portion 412 comprises the inner surface 422 having the threads 423, which form the inner threaded region 424. The inner threaded region 424 is configured to threadably engage the exterior threaded region 106 of the sensor 102, for example. Referring primarily to FIGS. 21-24, the outside portion 414 comprises an outer surface 426 having a hexagonal perimeter. The hexagonal perimeter can provide torqueing surfaces and facilitate rotation of the flexible nut 410 to thread the flexible nut 410 around the sensor 102.

The elastomeric element 416 can provide flexibility to the flexible nut 410. For example, the outside portion 414 can shift or move relative to the inside portion 412 as the elastomeric element 416 is deformed. In various instances, the elastomeric element 416 can be comprised of rubber, for example. Additionally or alternatively, the elastomeric element 416 can be comprised of a rubber-like material, such as silicone and/or latex, for example, and/or combinations thereof.

The inside portion 412 and the outside portion 414 of the flexible nut 410 can comprise a rigid or substantially inflexible material. In certain instances, the inside portion 412 and the outside portion 414 of the flexible nut 410 can be comprised of a metallic material, such as stainless steel, for example. Additionally or alternatively, the inside portion 412 and the outside portion 414 of the flexible nut 410 can be comprised of a plastic material, for example.

In various instances, the inside portion 412, the outside portion 414, and the elastomeric element 416 can be press fit or friction fit together. For example, the inside portion 412, the outside portion 414, and the elastomeric element 416 can include corresponding tongues and grooves, which can secure the parts 412, 414, 416 together. For example, referring primarily to FIGS. 22-24, the outside portion 414 includes an annular tongue 415, which protrudes radially inward. In various instances, the annular tongue 415 extends around the inner diameter of the outside portion 414. The outside portion 414 depicted in FIGS. 17 and 18 includes a pair of annular tongues 415. In other instances, the outside portion 414 can include less than two or more than two annular tongues 415.

Figure 25:
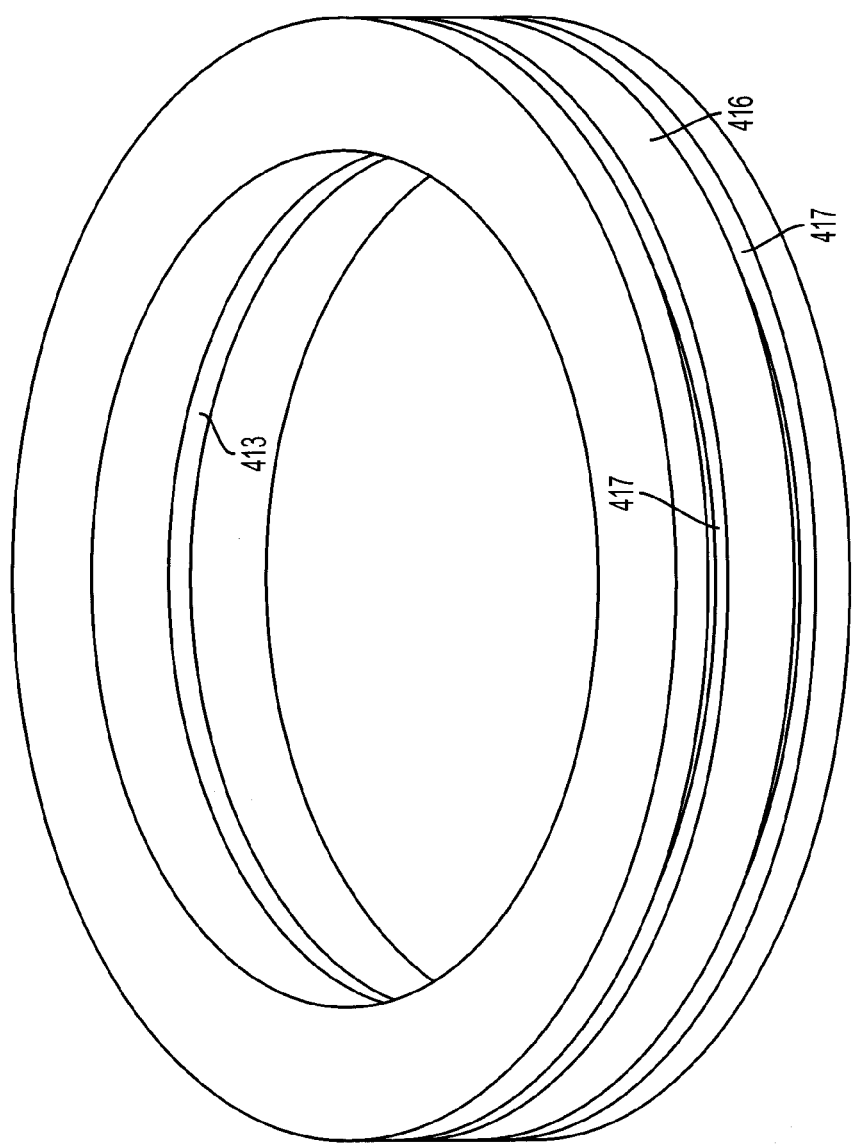
FIG. 25 is a perspective view of the elastomeric element of the flexible nut of FIG. 21, according to various embodiments of the present disclosure.

Referring now to FIGS. 22, 23, and 25, the elastomeric element 416 includes an annular outside groove 417, which is defined radially inward into the elastomeric element 416. In various instances, the annular outside groove 417 extends around the outside diameter of the elastomeric element 416. The annular outside groove 417 can be configured to receive and hold one of the annular tongues 415 of the outside portion 414. For example, the elastomeric element 416 depicted in FIGS. 22, 23, and 25 includes a pair of annular outside grooves 417, which are configured to receive and hold the pair of annular tongues 415 of the outside portion 414. The annular tongues 415 can be press fit or friction fit into the annular grooves 417 such that relative linear and rotational displacement of the outside portion 414 relative to the elastomeric element 416 is limited and/or prevented.

Figure 26:
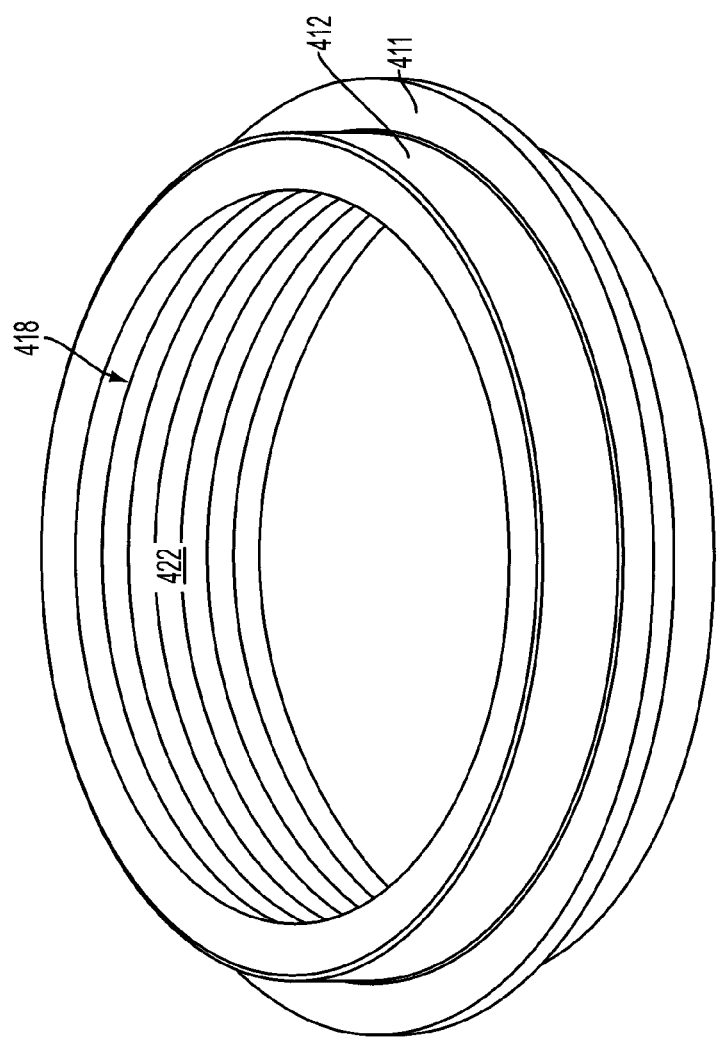
FIG. 26 is a perspective view of the inner portion of the flexible nut of FIG. 21, according to various embodiments of the present disclosure.

Referring now to FIGS. 22, 23, and 26, the inside portion 412 includes an annular tongue 411, which protrudes radially outward. In various instances, the annular tongue 411 extends around the outside diameter of the inside portion 412. In other instances, the inside portion 412 can include two or more annular tongues 411. Referring again to FIGS. 22, 23, and 25, the elastomeric element 416 includes an annular inside groove 413, which is defined radially inward into the elastomeric element 416. In various instances, the annular inside groove 413 extends around the inside diameter of the elastomeric element 416. The annular inside groove 413 can be configured to receive and hold an annular tongue 411 of the inside portion 412. For example, the annular tongue 411 can be press fit or friction fit into the annular groove 417 such that relative linear and rotational displacement of the inside portion 412 relative to the elastomeric element 416 is limited and/or prevented.

In various instances, the inside portion 412, the outside portion 414, and the elastomeric element 416 can form a unitary assembly. For example, when the annular tongues 411, 415 are press fit into the annular grooves 413, 417, respectively, the flexible nut 410 can comprise a one-piece assembly. Relative rotation and/or linear displacement of the various components can be limited and/or prevented. Additionally, because the elastomeric element 416 is flexible, the flexible nut 410 can be deformable and/or malleable within a predefined range of deformation. In some instances, adhesive and/or fasteners can be utilized in connection with the tongue and groove features or in lieu of the tongue and groove features to secure the inside portion 412, the outside portion 414, and the elastomeric element 416 of the flexible nut 410. For example, adhesive can be applied between the inside portion 412 and the elastomeric element 416 and/or between the outside portion 414 and the elastomeric element 416.

In use, the sensor 102 (FIGS. 1, 2, 14 and 15) can be positioned through the aperture 142 in the support 140 (FIGS. 1, 2, 14 and 15). The hex nut 130 (FIGS. 1, 2, and 15) can threadably engage the sensor 102 on the first side 144 (FIG. 15) of the support 140, and the flexible nut 410 can threadably engage the sensor 102 on the second side 146 of the support 140. The inside portion 412 of the flexible nut 410 can support the sensor 102 such that the sensor 102 is mounted to the support 140.

In the depicted arrangement, the sensor 102 extends through the support 140 and is held in position via the hex nut 130 on the first side 144 of the support 140, and the flexible nut 410 on the second side 146 of the support 140. Accordingly, the flexible nut 410 is positioned entirely on one side of the support 140 and is not positioned within the aperture 142 of the support 140. Rather, in the depicted arrangement, only the sensor 102 is positioned though the aperture 142 in the support 140, and thus, a standard-size sensor 102 and support 140 can be used. The sensor 102 can be held in position between the flexible nut 410 and the hex nut 130, which directly engage the sensor 102. Additionally, the flexible nut 410 can be configured to deform or flex to accommodate shifting and/or movement of the sensor 102 relative to the support 140.

For example, when an object collides or otherwise moves into abutting contact with the sensor 102, the elastomeric element 416 of the flexible nut 410 can be deformed within a predefined range of deformation. As the elastomeric element 416 is deformed, the sensor-supporting inner portion 412 of the flexible but 410 can shift to move or shift the sensor 102. When the object moves out of engagement with the sensor 102, the elastomeric element 416 can rebound and expand or otherwise return to its initial, undeformed configuration, for example.

Figure 27:
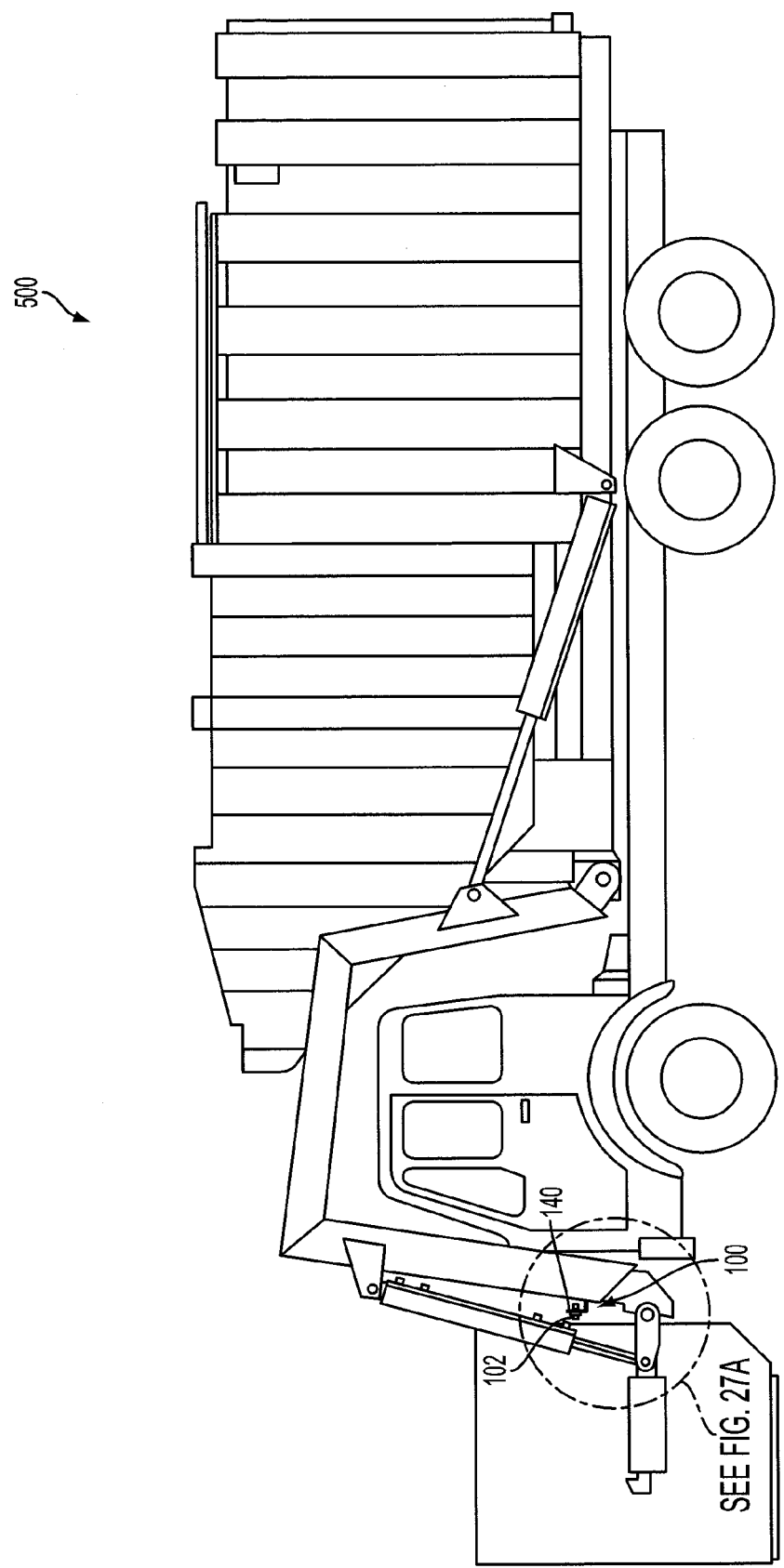
FIG. 27 is an elevation view of a vehicle having the sensor of FIG. 1 mounted thereto via the flexible mount and the support of FIG. 1, according to various embodiments of the present disclosure.
Figure 27A:
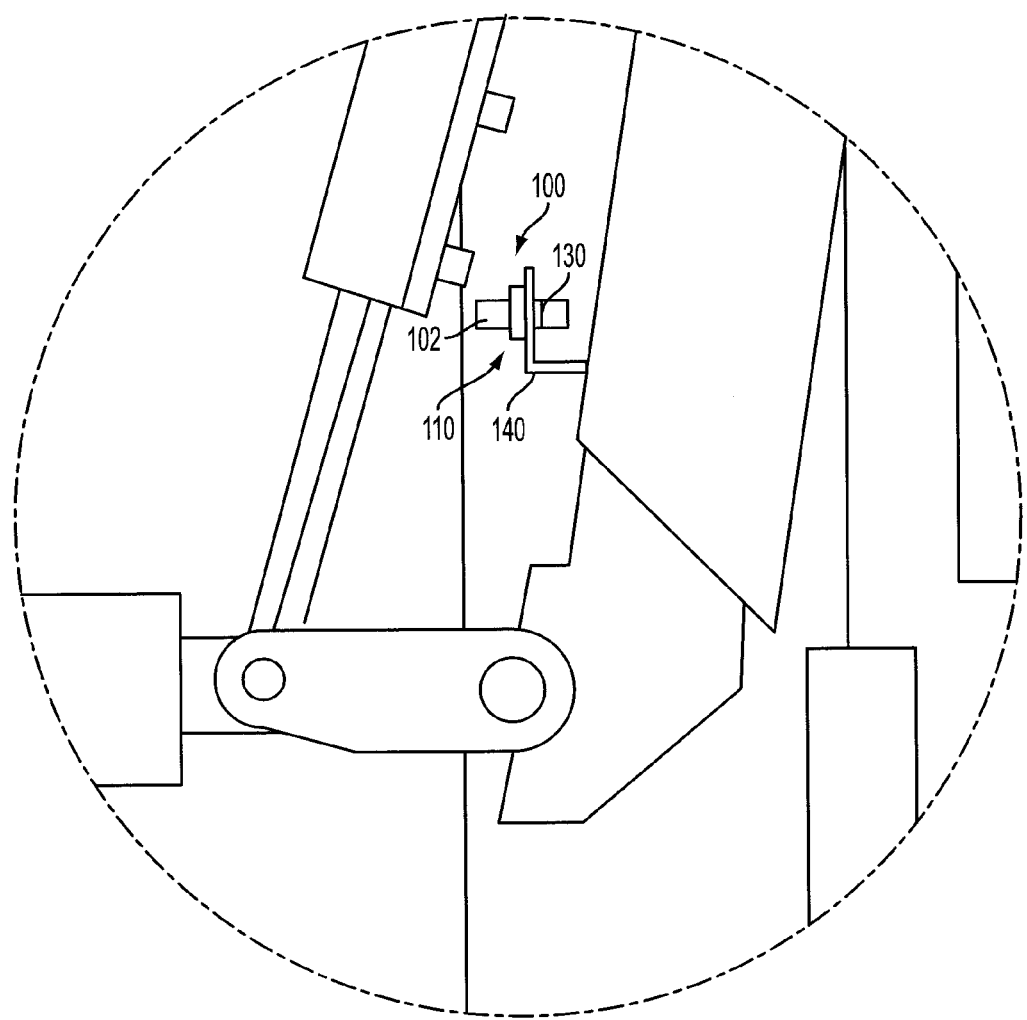
FIG. 27A is a detail view of a portion of the vehicle of FIG. 27, according to various embodiments of the present disclosure.

Referring now to FIGS. 27 and 27A, a vehicle 500 is depicted. The depicted vehicle 500 comprises a waste disposal truck. In other instances, the vehicle can comprise a pickup truck, semi-trailer truck, car, van, motorcycle, and/or cart, for example. The reader will appreciate that the various sensors and sensor mounts described herein can be mounted to various different types of vehicles or other structures, for example. Referring again to FIGS. 27 and 27A, the support 140 can be fixed or fastened to the vehicle 500, for example. In various instances, the support 140 and the flexible mount 100 can direct the sensor 102 positioned therein in the direction of movement of the vehicle 500. For example, the support 140 depicted on the vehicle 500 is configured to direct the sensor 102 forward, such that the sensor 102 provides feedback to the vehicle 500 when moving toward a front-loader refuse container 510, for example. In other instances, the support 140 can direct the sensor 102 toward the side of the vehicle 500 and/or rearward, for example. The reader will appreciate that sensor mounts 300 and 400 can also be used to mount the sensor 102 to the mount 140 on the vehicle 500, for example.

The reader will further appreciate that the various sensor mounts described herein can be employed with various types of sensors and various different applications and industries. While sensor mounts have been described as having exemplary designs, the present invention may be further modified within the spirit and scope of the disclosure. This application is therefore intended to cover any variations, uses, or adaptations of the invention using its general principles. Further, this application is intended to cover such departures from the present disclosure as come within known or customary practice in the art to which this invention pertains.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

I claim:

1. An assembly for use with a support, the support comprising a first side and a second side, wherein an aperture is defined through the support from the first side to the second side, the assembly comprising:
    a proximity sensor comprising an outer surface, wherein the outer surface comprises a first threaded portion;
    a casing, comprising:
        a first part mounted to the proximity sensor;
        a second part, wherein the first part is movable relative to the second part between a retracted position and an expanded position; and
        an inner surface comprising a second threaded portion configured to threadably engage the first threaded portion;
    a flexible member intermediate the first part and the second part, wherein the flexible member is configured to bias the second part toward the expanded position; and
    a nut threadably mounted to the first threaded portion of the proximity sensor;
    wherein, when the proximity sensor extends through the aperture in the support, the casing is disposed entirely on the first side of the support.

2. The assembly of claim 1, wherein the nut is positioned on the second side of the support.

3. The assembly of claim 2, wherein the proximity sensor is movable within the aperture.

4. The assembly of claim 1, wherein the first part of the casing comprises a pin, and wherein the second part of the casing comprises a bayonet slot structured and dimensioned to receive the pin.

5. The assembly of claim 1, wherein a groove is defined into the inner surface of the casing, and wherein the assembly further comprises a locking ring positioned in the groove.

6. The assembly of claim 1, wherein the proximity sensor comprises an inductive sensor.

7. The assembly of claim 1, wherein the flexible member comprises a wave spring.

8. An assembly, comprising:
   a proximity sensor comprising an outer surface, wherein the outer surface comprises a first threaded portion; and
   a nut, comprising:
      an inside portion comprising an inner surface, wherein the inner surface comprises a second threaded portion configured to threadably engage the first threaded portion;
      an outside portion spaced apart from and not in contact with the inside portion; and
      an elastomeric element intermediate the inside portion and the outside portion.

9. The assembly of claim 8, further comprising a support, wherein an aperture is defined through the support, wherein the proximity sensor extends through the aperture.

10. The assembly of claim 9, wherein the proximity sensor is movable within the aperture.

11. The assembly of claim 9, wherein the nut comprises a first nut, and wherein the assembly further comprises a second nut threadably mounted to the first threaded portion.

12. The assembly of claim 11, wherein the support comprises a first side and a second side, wherein the first nut is positioned adjacent to the first side of the support, and wherein the second nut is positioned adjacent to the second side of the support.

13. The assembly of claim 8, wherein the inside portion comprises an annular tongue, and wherein the elastomeric element comprises an annular groove structured and dimensioned to receive the annular tongue.

14. The assembly of claim 8, wherein the outside portion comprises an annular tongue, and wherein the elastomeric element comprises an annular groove structured and dimensioned to receive the annular tongue.

15. The assembly of claim 8, wherein the elastomeric element is comprised of rubber.

16. The assembly of claim 8, wherein the inside portion and the outside portion are comprised of metal.

17. The assembly of claim 8, wherein the proximity sensor comprises an inductive sensor.

18. An assembly, comprising:
   a proximity sensor comprising an outer surface, wherein the outer surface comprises a sensor threaded portion;
   a sleeve, comprising:
      an inside portion comprising an inner surface, wherein the inner surface comprises an inner threaded portion configured to threadably engage the sensor threaded portion;
      an outside portion comprising an outer surface, wherein the outer surface comprises an outer threaded portion and wherein the outside portion is spaced apart from and not in contact with the inside portion; and
      an elastomeric element intermediate the inside portion and the outside portion; and
   a nut configured to threadably engage the outer threaded portion of the sleeve.

19. The assembly of claim 18, further comprising a support, wherein an aperture is defined through the support, and wherein the proximity sensor is movable within the aperture.

* * * * *